United States Patent
Bailo et al.

(10) Patent No.: US 12,548,249 B2
(45) Date of Patent: Feb. 10, 2026

(54) INCREMENTAL SURFACE COMPLETION

(71) Applicant: QUALCOMM Incorporated, San Diego, CA (US)

(72) Inventors: Oleksandr Bailo, Amsterdam (NL); Mohsen Ghafoorian, Diemen (NL); Jihong Ju, Amsterdam (NL); Gerhard Reitmayr, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 18/537,442

(22) Filed: Dec. 12, 2023

(65) Prior Publication Data

US 2025/0191288 A1    Jun. 12, 2025

(51) Int. Cl.
*G06T 17/00*    (2006.01)
*G06T 7/50*    (2017.01)
*G06T 7/60*    (2017.01)

(52) U.S. Cl.
CPC ............... *G06T 17/00* (2013.01); *G06T 7/50* (2017.01); *G06T 7/60* (2013.01); *G06T 2207/20084* (2013.01); *G06T 2210/12* (2013.01)

(58) Field of Classification Search
CPC .. G06T 17/00; G06T 7/50; G06T 7/60; G06T 2207/20084; G06T 2210/12
USPC ......................................................... 345/420
See application file for complete search history.

(56) References Cited

U.S. PATENT DOCUMENTS

| | | | | |
|---|---|---|---|---|
| 2021/0012576 A1* | 1/2021 | Riegler | ..................... | G06N 3/08 |
| 2021/0142497 A1* | 5/2021 | Pugh | ..................... | G06T 7/543 |
| 2021/0217200 A1* | 7/2021 | Oh | ..................... | G06T 17/00 |
| 2021/0279943 A1* | 9/2021 | Murez | ..................... | G06T 7/55 |
| 2022/0067983 A1* | 3/2022 | Fidler | ..................... | G06V 10/26 |
| 2022/0292699 A1* | 9/2022 | Zhu | ..................... | G06T 7/90 |
| 2023/0153965 A1* | 5/2023 | Bai | ..................... | G06T 3/4053 |
| | | | | 382/254 |
| 2023/0360241 A1* | 11/2023 | Sayed | ..................... | G06T 17/00 |

(Continued)

OTHER PUBLICATIONS

Attene M., et al., "Polygon Mesh Repairing: An Application Perspective", arxiv.org, Cornell University Library, 201 Olin Library Cornell University Ithaca, NY 14853, ACM computing Surveys, vol. 45, No. 2, Mar. 12, 2013, pp. 1-33, Feb. 2013, XP058013427, abstract.

(Continued)

*Primary Examiner* — David T Welch
(74) *Attorney, Agent, or Firm* — Satheesh Kumar Karra; Polsinelli LLP

(57) ABSTRACT

Systems and techniques are described herein for reconstructing a three-dimensional (3D) scene of an environment. For example, a computing device can obtain a 3D reconstruction of the 3D scene, wherein the 3D reconstruction of the 3D scene includes reconstructions of geometry information of objects included in one or more images of the 3D scene, determine one or more regions of the 3D reconstruction of the 3D scene that include missing geometry information of the objects included in the one or more images of the 3D scene, determine, using a machine learning system, geometry information for the one or more regions of the 3D reconstruction of the 3D scene, and refine the 3D reconstruction of the 3D scene using the geometry information determined for the one or more regions of the 3D reconstruction of the 3D scene.

19 Claims, 12 Drawing Sheets

(56) References Cited

U.S. PATENT DOCUMENTS

| | | | | |
|---|---|---|---|---|
| 2023/0419526 | A1* | 12/2023 | Lianos | G06T 7/194 |
| 2023/0419557 | A1* | 12/2023 | Yoon | H04N 19/70 |
| 2024/0005627 | A1* | 1/2024 | Sharma | G06T 3/40 |
| 2024/0009851 | A1* | 1/2024 | Mousavian | B25J 9/1697 |
| 2024/0029358 | A1* | 1/2024 | Sharma | G06T 17/205 |
| 2024/0135612 | A1* | 4/2024 | Hold-Geoffroy | G06T 7/50 |
| 2024/0144623 | A1* | 5/2024 | Gori | G06T 19/20 |
| 2024/0161382 | A1* | 5/2024 | Kim | G06V 10/54 |
| 2024/0169563 | A1* | 5/2024 | Wen | G06T 7/11 |
| 2024/0212189 | A1* | 6/2024 | Cavallari | G06V 10/82 |
| 2024/0324852 | A1* | 10/2024 | Bouhnik | A61B 34/25 |
| 2024/0362758 | A1* | 10/2024 | Bagnall | G06V 20/70 |
| 2024/0378832 | A1* | 11/2024 | Joachim | G06T 5/50 |
| 2025/0078406 | A1* | 3/2025 | Yoon | G06T 5/77 |

OTHER PUBLICATIONS

Dai A., et al., "Shape Completion Using 3D-Encoder-Predictor CNNs and Shape Synthesis", 2017 IEEE Conference on Computer Vision and Pattern Recognition (CVPR), IEEE Computer Society, US, Jul. 21, 2017, pp. 6545-6554, XP033250019, abstract.

Hernandez-Bautista M., et al., "Deep Learning of Curvature Features for Shape Completion", Computers and Graphics, vol. 115, Jul. 16, 2023, pp. 204-215, XP093238063, abstract, section 1, section 3, figure 1.

International Search Report and Written Opinion—PCT/US2024/052112—ISA/EPO—Jan, 27, 2025.

Ito S., et al., "Detection of Defective Regions in 3D Reconstruction to Support Image Acquisition", SICE Journal of Control, Measurement, and System Integration, vol. 10, No. 5, Sep. 1, 2017, pp. 402-409, XP093238367, 9 Pages, abstract, section: 3.3.1.

* cited by examiner

FIG. 9A
FIG. 9B
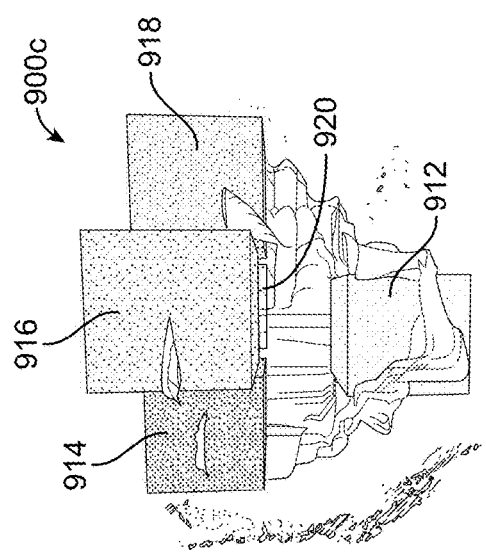
FIG. 9C
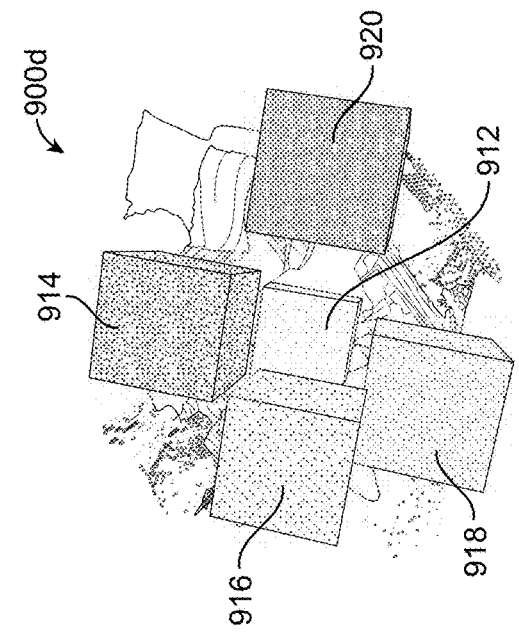
FIG. 9D

INCREMENTAL SURFACE COMPLETION

FIELD

The present disclosure generally relates to refining three-dimensional (3D) reconstructions of a 3D scene. For example, aspects of the present disclosure relate to systems and techniques for performing incremental surface completion to refine 3D reconstructions of a scene based on determining one or more regions of an incomplete 3D reconstruction.

BACKGROUND

Many devices and systems utilize 3D technology for a wide variety of different use cases, including mobile devices (e.g., mobile phones), extended reality (XR) systems (e.g., virtual reality (VR), augmented reality (AR), and/or mixed reality (MR)), vehicles (e.g., autonomous or semi-autonomous vehicles), robotics systems, among others. Such systems can include sensors that capture frames of data (e.g., image frames or other type of data) of an environment. The data can be used to reconstruct a 3D scene of the environment.

However, a thorough scanning of the environment is a challenging process and often results in missing surfaces and/or objects. These missing surfaces and/or objects are a result of an insufficient number of, or even a complete absence of, observations of a specific part of the environment. To have a truly immersive experience, it is important that a 3D reconstruction of the 3D scene has accurate and complete geometry of the environment. For example, if a surface is not accurately reconstructed in the 3D reconstruction, a virtual object can fall through a hole in the scene and cause a disconnect between the user and an immersive experience.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described herein for incrementally completing surfaces by refining one or more incomplete 3D reconstructions of a 3D scene. According to some examples, an apparatus for reconstructing a three-dimensional (3D) scene of an environment includes at least one memory, and at least one processor coupled to the at least one memory, the at least one processor configured to: obtain a 3D reconstruction of the 3D scene, wherein the 3D reconstruction of the 3D scene includes reconstructions of geometry information of objects included in one or more images of the 3D scene, determine one or more regions of the 3D reconstruction of the 3D scene that include missing geometry information of the objects included in the one or more images of the 3D scene, determine, using a machine learning system, geometry information for the one or more regions of the 3D reconstruction of the 3D scene, and refine the 3D reconstruction of the 3D scene using the geometry information determined for the one or more regions of the 3D reconstruction of the 3D scene.

In another illustrative example, a method for reconstructing a three-dimensional (3D) scene of an environment is provided. The method includes: obtaining a 3D reconstruction of the 3D scene, wherein the 3D reconstruction of the 3D scene includes reconstructions of geometry information of objects included in one or more images of the 3D scene, determining one or more regions of the 3D reconstruction of the 3D scene that include missing geometry information of the objects included in the one or more images of the 3D scene, determining, using a machine learning system, geometry information for the one or more regions of the 3D reconstruction of the 3D scene, and refining the 3D reconstruction of the 3D scene using the geometry information determined for the one or more regions of the 3D reconstruction of the 3D scene.

In another illustrative example, a non-transitory computer-readable storage medium is provided comprising instructions stored thereon which, when executed by at least one processor, cause the at least one processor to: obtain a 3D reconstruction of the 3D scene, wherein the 3D reconstruction of the 3D scene includes reconstructions of geometry information of objects included in one or more images of the 3D scene, determine one or more regions of the 3D reconstruction of the 3D scene that include missing geometry information of the objects included in the one or more images of the 3D scene, determine, using a machine learning system, geometry information for the one or more regions of the 3D reconstruction of the 3D scene, and refine the 3D reconstruction of the 3D scene using the geometry information determined for the one or more regions of the 3D reconstruction of the 3D scene.

In another illustrative example, an apparatus is provided for reconstructing a three-dimensional (3D) scene of an environment. The apparatus includes: means for obtaining a 3D reconstruction of the 3D scene, wherein the 3D reconstruction of the 3D scene includes reconstructions of geometry information of objects included in one or more images of the 3D scene, means for determining one or more regions of the 3D reconstruction of the 3D scene that include missing geometry information of the objects included in the one or more images of the 3D scene, means for determining, using a machine learning system, geometry information for the one or more regions of the 3D reconstruction of the 3D scene, and means for refining the 3D reconstruction of the 3D scene using the geometry information determined for the one or more regions of the 3D reconstruction of the 3D scene.

In some aspects, one or more of apparatuses described herein include a mobile device (e.g., a mobile telephone or so-called "smart phone" or other mobile device), a wireless communication device, a vehicle or a computing device, system, or component of the vehicle, an extended reality device (e.g., a virtual reality (VR) device, an augmented reality (AR) device, or a mixed reality (MR) device), a wearable device, a personal computer, a laptop computer, a server computer, a camera, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications (e.g., associated with processing of the image), and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9A and FIG. 9B illustrate various views of an incomplete 3D reconstruction of a 3D scene, in accordance with some examples.

FIG. 9C and FIG. 9D illustrate various views of an incomplete 3D reconstruction of a 3D scene with bounding regions, in accordance with some examples.

DETAILED DESCRIPTION

Figure 1:
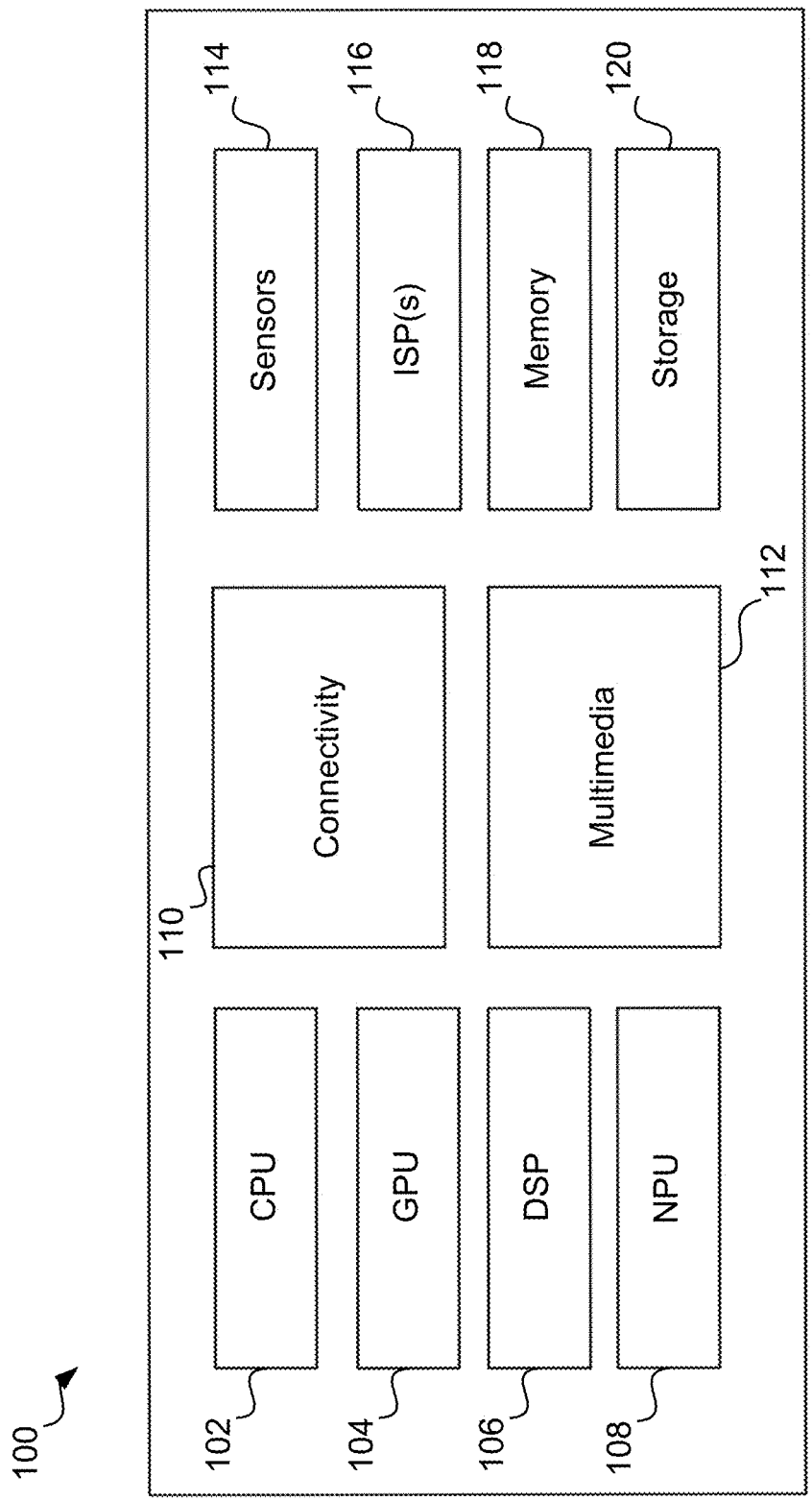
FIG. 1 illustrates an example implementation of a system-on-a-chip (SoC), in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the disclosure. However, it will be apparent that various aspects and examples may be practiced without these specific details. The figures and description are not intended to be restrictive.

The ensuing description provides exemplary aspects and examples only, and is not intended to limit the scope, applicability, or configuration of the disclosure. Rather, the ensuing description of the exemplary aspects and examples will provide those skilled in the art with an enabling description for implementing aspects and examples of the disclosure. It should be understood that various changes may be made in the function and arrangement of elements without departing from the scope of the application as set forth in the appended claims.

As noted above, many devices and systems utilize 3D technology for a wide variety of different use cases including, but not limited to, mobile devices, extended reality (XR) systems (e.g., virtual reality (VR), augmented reality (AR), mixed reality (MR), and/or other types of XR systems), vehicle systems, robotics systems, among others. These devices and systems have seen adoption by consumers for entertainment and by businesses for increased productivity. Sensors of such devices or systems can capture sensor data of an environment. For instance, an image-capture device (e.g., an image sensor such as a camera) of a device or system (e.g., a mobile device, XR device, etc.) can capture images of the environment. Other examples of sensors include radar sensors, light-detection and ranging (LIDAR) sensors, among others. The sensor data can be used to perform three-dimensional reconstruction (3DR) techniques to reconstruct a 3D scene of the environment. A resulting 3D reconstruction can be used for a wide variety of different activities including, but not limited to, occlusion rendering, collision avoidance, plane detection, physical simulations, etc.

To build an immersive experience, it is important for a 3D reconstruction of the 3D scene to have accurate and complete geometry of the environment. Complete 3D scene reconstruction is also important for other XR applications, such as occlusion rendering, which uses depth and object segmentation to render virtual objects in a 3D environment. For example, if a surface is not accurately reconstructed in the 3D reconstruction, a hole may exist in the 3D reconstruction and a virtual object can fall through the hole in the scene, causing a disconnect between the user and an immersive experience. As another example, accurate and complete 3D reconstruction is important for collision avoidance, which may use depth to estimate distance to objects.

However, a thorough scanning of the environment is a challenging process and often results in missing surfaces and/or objects. These missing surfaces and/or objects can be a result of an insufficient number of, or even a complete absence of, observations of (e.g., captured images covering) a specific part of the environment.

Additionally, a thorough scanning of an environment can often be time consuming, physically challenging, and difficult to determine during the scanning. For example, a user might have little to no visibility of surfaces and/or objects that were sufficiently observed after scanning a scene using an image sensor (e.g., a camera) from multiple different perspectives or viewpoints.

In some cases, a trained neural network can be applied to an incomplete 3D reconstruction for full scene refinement.

While full scene refinement can result in high-quality surface completion, both quantitatively and qualitatively, full scene refinement can be challenging to implement in real-world applications. For example, scanning of environments occur in real-time and can be consistently ongoing. As discussed above, a thorough scan of an environment is time consuming and is consequently challenging to implement in real-time. Furthermore, refining full scenes at once is resource-intensive and can exceed available resources on some devices.

In other cases, a sliding window technique can be performed to refine incomplete 3D reconstructions. For example, the sliding window technique can incrementally process portions of a scan (e.g., partial scans). Such an approach can be less resource intensive during inference of a neural network as compared to a full scene refinement approach. However, the sliding window technique can result in performing a substantial number of inferences to cover a scene. Furthermore, some criteria or requirements would likely be necessary to determine division of regions. Otherwise, interferences of areas where the model has insufficient neighboring geometries can result in hallucinations of structure, while some locations may be included in multiple divisions and be refined multiple times, which can cause over-smoothing.

Systems, apparatuses, processes (also referred to as methods), and computer-readable media (collectively referred to as "systems and techniques") are described herein for performing incremental surface completion to refine incomplete 3D reconstructions of a scene. In some cases, the systems and techniques can perform incremental region selection (e.g., by determining one or more regions of the incomplete 3D reconstruction for refinement) and/or determination of the incomplete 3D reconstruction for refinement. Such an approach provides a light-weight strategy for refining incomplete 3D reconstructions. For instance, the incremental refinement of the incomplete 3D reconstruction leverages fewer inferences per scene based on applying refinement only to regions requiring completion (e.g., holes, areas having missing geometry information, etc.).

Furthermore, the systems and techniques address the challenges of determining regions of a 3D reconstruction that require completion and/or refinement. For example, one or more regions can be identified as candidates for refinement based on several factors or criteria. In some cases, a point or region can be a good candidate for refinement if the point or region is unobserved or insufficiently observed and if there exists a dimension where the farthest away geometry is within a threshold distance (e.g., the farthest way surface is not too far away).

When a point or region of a 3D reconstruction is determined to be a good candidate for refinement, a bounding region (e.g., a 3D tile, which may be in the shape of a cube or other shape) can be generated to cover the point or region. For example, a bounding region can be generated so that a point or region of the 3D reconstruction is in or otherwise included in the bounding region. According to some aspects, the bounding region can have a "center of mass" or otherwise be centrally located around the point or region. In some implementations, regions within the bounding region can be suppressed or otherwise removed from subsequent consideration for candidates for refinement. Such suppression or removal can reduce, or even prevent, the point or region from being selected and/or otherwise identified multiple times. The bounding region can then be input to a machine learning system (e.g., a neural network), such as a sparse generative neural network (SG-NN), for refinement and/or completion.

Since bounding regions are not selected or otherwise identified multiple times, refined regions are not refined multiple times, which results in less resources being used for the scene. Furthermore, since the regions for refinement (e.g., the bounding regions) are selected on an "as needed" basis and in limited sizes, the amount of resources and time needed to process the data is significantly reduced. Consequently, incremental refinement of incomplete 3D reconstructions can be performed in real-time on a wider variety of devices or systems including, but not limited to, mobile devices (e.g., mobile phones), XR headsets (e.g., head-mounted devices (HMDs) or XR glasses), vehicles (e.g., autonomous vehicles, semi-autonomous vehicles, etc.), robotics devices, and/or other types of devices or systems.

In some implementations, the refined regions can be further refined by a machine learning system (e.g., a neural network or other machine learning system) with additional or subsequent observations by one or more sensors (e.g., image sensors such as cameras, radar sensors, LIDAR sensors, etc.). Because the systems and techniques perform the refinement of a 3D reconstruction incrementally, each region of the 3D reconstruction that has been refined can be identified or classified as refined or otherwise classified. As additional observations are collected by the sensors, the additional data can be used to further refine the regions. For example, as a user looks around a room with an XR headset (e.g., an AR or MR HMD or glasses), an image sensor (or other sensor) of the XR headset can collect more data for the room and the contents therein. As more data is collected, the XR headset may perform fewer and/or smaller refinements to the 3D reconstruction due to fewer regions of the 3D reconstruction having missing geometry information.

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108 (and/or a neural signal processor (NSP)), in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include one or more sensors 114, image signal processors (ISPs) 116, and/or storage 120.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform disparity estimation refinement for pairs of images (e.g., stereo image pairs, each including a left image and a right image). SOC 100 can be part of a computing device or multiple computing devices. In some examples, SOC 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

Machine learning (ML) can be considered a subset of artificial intelligence (AI). ML systems can include algorithms and statistical models that computer systems can use to perform various tasks by relying on patterns and inference, without the use of explicit instructions. An example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, sparse generative neural networks (SG-NN), fully convolutional networks (FCNs), among others. For instance, convolutional neural networks (CNNs) are a type of feedforward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data. An example FCN can include a 3D U-Net, the architecture of which is configured to utilize fewer training images and to yield more precise segmentation therefrom.

Deep learning (DL) is an example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Figure 2A:
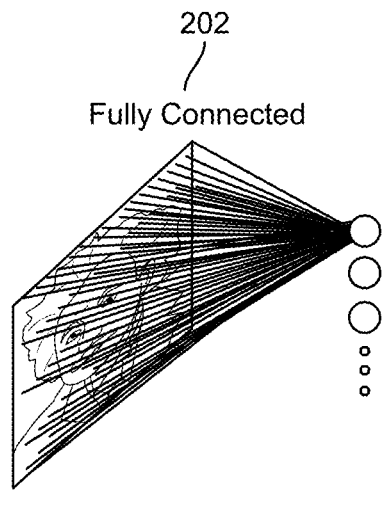
FIG. 2A illustrates an example of a fully connected neural network, in accordance with some examples.
Figure 2B:
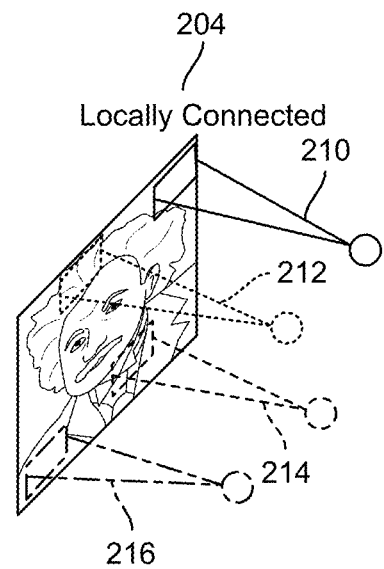
FIG. 2B illustrates an example of a locally connected neural network, in accordance with some examples.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
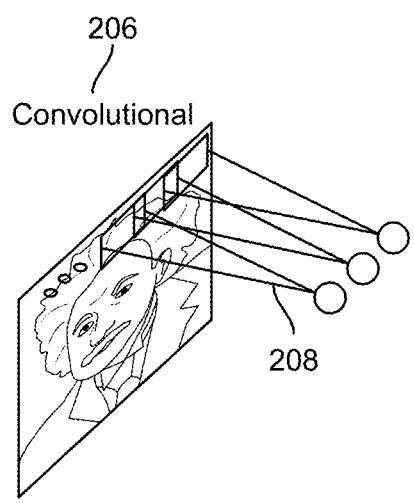
FIG. 2C illustrates an example of a convolutional neural network, in accordance with some examples.

An example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure. An illustrative example of a deep learning network is described in greater depth with respect to the example block diagram of FIG. 3. An illustrative example of a convolutional neural network is described in greater depth with respect to the example block diagram of FIG. 4.

Figure 3:
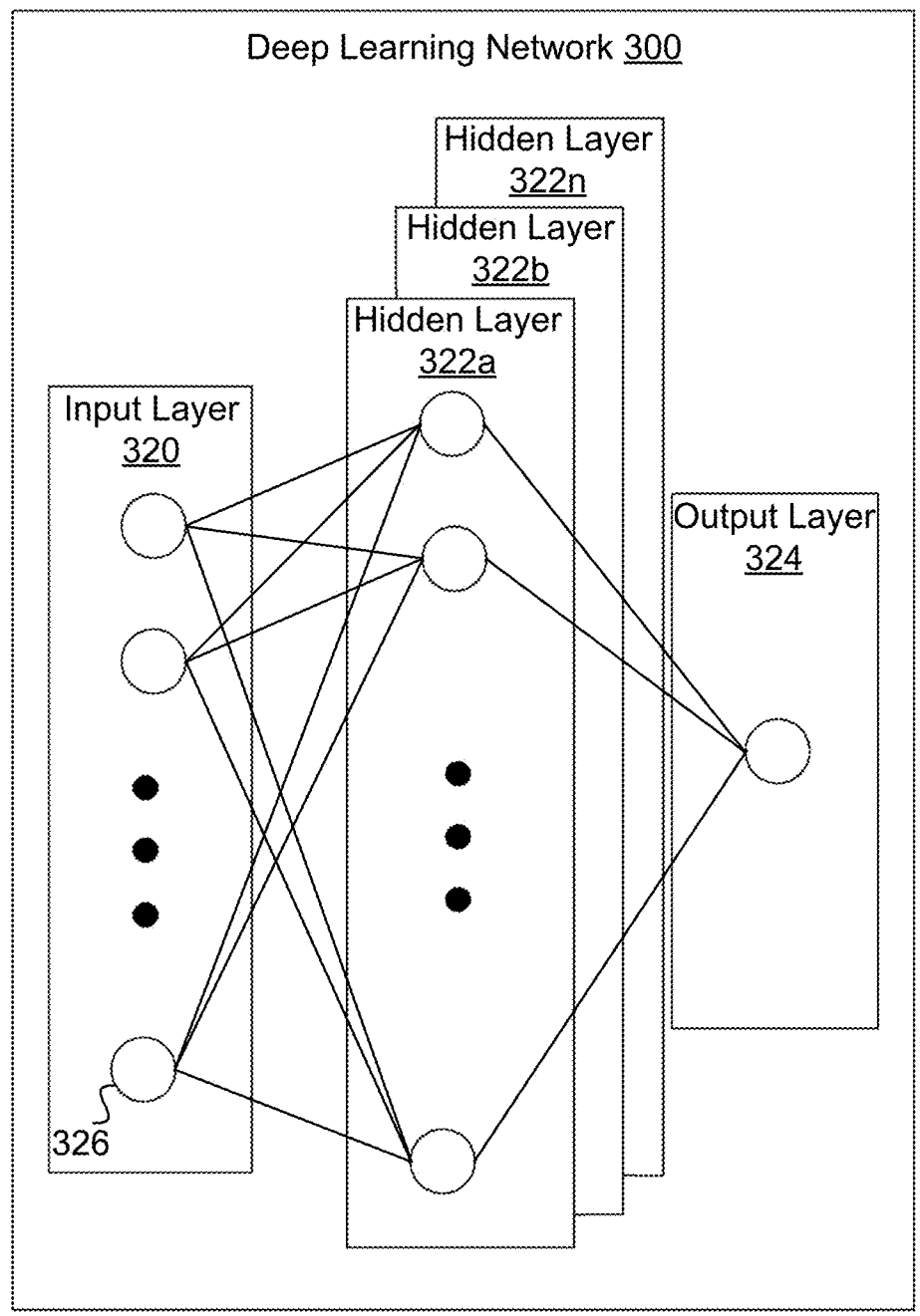
FIG. 3 is a block diagram illustrating an example of a deep learning network, in accordance with some examples.

FIG. 3 is an illustrative example of a deep learning neural network 300 that can be used by a machine learning model. An input layer 320 includes input data. In some examples, the input layer 320 can include data representing the pixels of an input video frame. The neural network 300 includes multiple hidden layers 322a, 322b, through 322n. The hidden layers 322a, 322b, through 322n include "n" number of hidden layers, where "n" is an integer greater than or equal to one. The number of hidden layers can be made to include as many layers as needed for the given application. The neural network 300 further includes an output layer 324 that provides an output resulting from the processing performed by the hidden layers 322a, 322b, through 322n. In some examples, the output layer 324 can provide a classification for an object in an input video frame. The classification can include a class identifying the type of object (e.g., a person, a dog, a cat, or other object).

The neural network 300 is a multi-layer neural network of interconnected nodes. Each node can represent a piece of information. Information associated with the nodes is shared among the different layers and each layer retains information as information is processed. In some cases, the neural network 300 can include a feed-forward network, in which case there are no feedback connections where outputs of the network are fed back into itself. In some cases, the neural network 300 can include a recurrent neural network, which can have loops that allow information to be carried across nodes while reading in input.

Information can be exchanged between nodes through node-to-node interconnections between the various layers. Nodes of the input layer 320 can activate a set of nodes in the first hidden layer 322a. For example, as shown, each of the input nodes of the input layer 320 is connected to each of the nodes of the first hidden layer 322a. The nodes of the hidden layers 322a, 322b, through 322n can transform the information of each input node by applying activation functions to the information. The information derived from the transformation can then be passed to and can activate the nodes of the next hidden layer 322b, which can perform their own designated functions. Example functions include convolutional, up-sampling, data transformation, and/or any other suitable functions. The output of the hidden layer 322b can then activate nodes of the next hidden layer, and so on. The output of the last hidden layer 322n can activate one or more nodes of the output layer 324, at which an output is provided. In some cases, while nodes (e.g., node 326) in the neural network 300 are shown as having multiple output lines, a node has a single output and all lines shown as being output from a node represent the same output value.

In some cases, each node or interconnection between nodes can have a weight that is a set of parameters derived from the training of the neural network 300. Once the neural network 300 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 300 to be adaptive to inputs and able to learn as more and more data is processed.

The neural network 300 is pre-trained to process the features from the data in the input layer 320 using the different hidden layers 322a, 322b, through 322n in order to provide the output through the output layer 324. In an example in which the neural network 300 is used to identify objects in images, the neural network 300 can be trained using training data that includes both images and labels. For instance, training images can be input into the network, with each training image having a label indicating the classes of the one or more objects in each image (basically, indicating to the network what the objects are and what features they have). In some examples, a training image can include an image of a number 2, in which case the label for the image can be [0 0 1 0 0 0 0 0 0 0].

In some cases, the neural network 300 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 300 is trained well enough so that the weights of the layers are accurately tuned.

For the example of identifying objects in images, the forward pass can include passing a training image through the neural network 300. The weights are initially randomized before the neural network 300 is trained. The image can include, for example, an array of numbers representing the pixels of the image. Each number in the array can include a value from 0 to 255 describing the pixel intensity at that position in the array. In some examples, the array can include a 28×28×3 array of numbers with 28 rows and 28 columns of pixels and 3 color components (such as red, green, and blue, or luma and two chroma components, or the like).

For a first training iteration for the neural network 300, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 300 is unable to determine low level features and thus cannot make an accurate determination of what the classification of the object might be. A loss function can be used to analyze error in the output. Any suitable loss function definition can be used. An example of a loss function includes a mean squared error (MSE). The MSE is defined as $$E_{total} = \sum \frac{1}{2}(\text{target} - \text{output})^2,$$

which calculates the sum of one-half times a ground truth output (e.g., the actual answer) minus the predicted output (e.g., the predicted answer) squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 300 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$\omega = \omega_i - \eta \frac{dL}{dW},$$

where w denotes a weight, $w_i$ denotes the initial weight, and n denotes a as learning rate. The learning rate can be set to any suitable value, with a high learning rate including larger weight updates and a lower value indicating smaller weight updates.

The neural network 300 can include any suitable deep network. As described previously, an example of a neural network 300 includes a convolutional neural network (CNN), which includes an input layer and an output layer, with multiple hidden layers between the input and out layers. An example of a CNN is described below with respect to FIG. 4. The hidden layers of a CNN include a series of convolutional, nonlinear, pooling (for downsampling), and fully connected layers. The neural network 300 can include any other deep network other than a CNN, such as an autoencoder, a deep belief nets (DBNs), a Recurrent Neural Networks (RNNs), among others.

For example, the neural network 300 can include a sparse generative neural network (SG-NN). A SG-NN model can be self-supervised and trained solely on real-world data (e.g., real-world scans). In some implementations, the real-world data can be incomplete. For example, the real-world scans may include missing geometry information, such that the scans are not completely reflective of the real-world. To facilitate self-supervision, training the SG-NN can include removing frames from a given 3D scan in order to make the given 3D scan even more incomplete. Self-supervision can then be formulated by correlating two levels of partialness of the same scan. Additionally, the data can be processed to mask and/or remove regions that have not been observed. Holes or missing data created by frame subsampling are within observed regions and form the basis of learning to handle the missing data. Through generalization across a large training set, the SG-NN model can then predict 3D scene completion without ever seeing any 3D scan of entirely complete geometry. The SG-NN model learns to generate a complete 3D model beyond the completeness of target training data. In some implementations, the SG-NN can be supervised by L1 loss on log-transforms of truncated signed distance function (TSDF) values.

Figure 4:
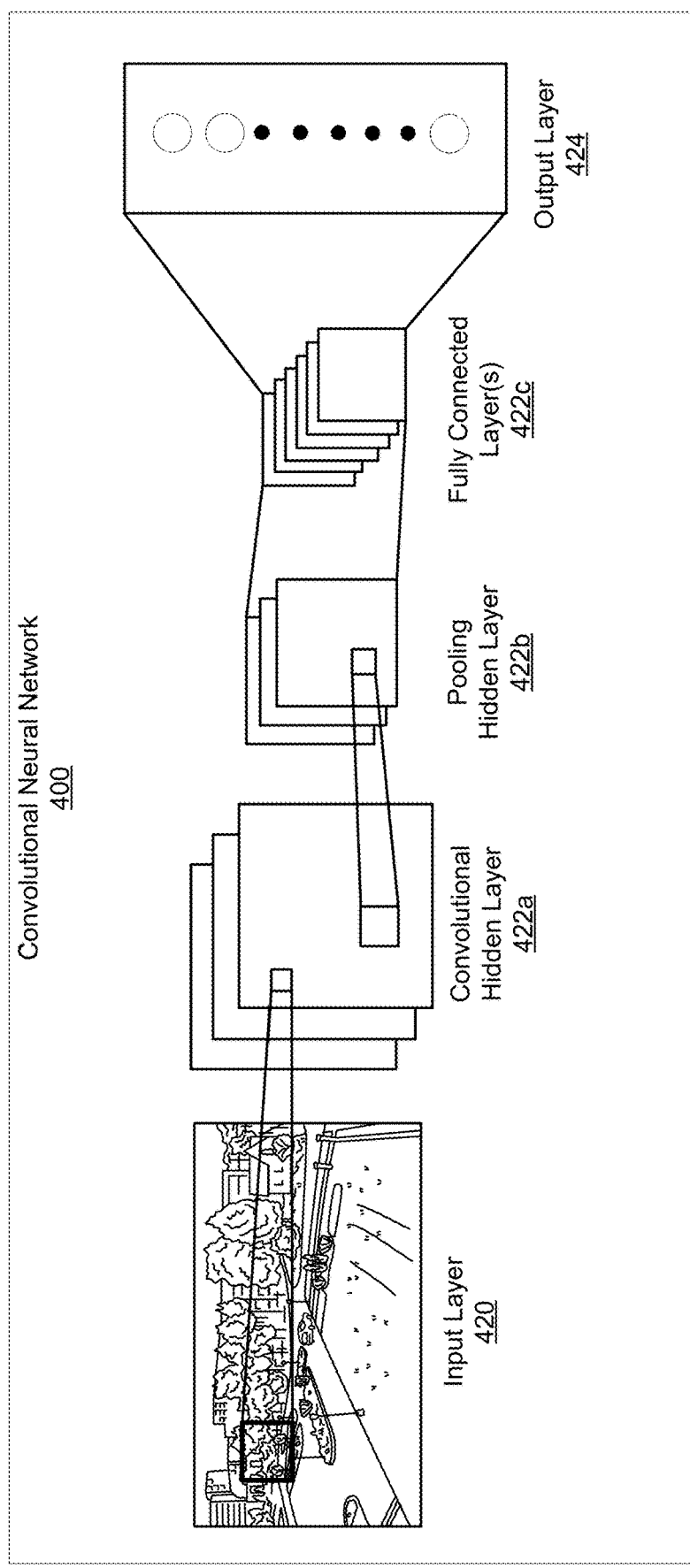
FIG. 4 is a block diagram illustrating an example of a convolutional neural network, in accordance with some examples.

FIG. 4 is an illustrative example of a convolutional neural network 400 (CNN 400). The input layer 420 of the CNN 400 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 422a, an optional non-linear activation layer, a pooling hidden layer 422b, and fully connected hidden layers 422c to get an output at the output layer 424. While only one of each hidden layer is shown in FIG. 4, one of ordinary skill will appreciate that multiple convolutional hidden layers, non-linear layers, pooling hidden layers, and/or fully connected layers can be included in the CNN 400. As previously described, the output can indicate a single class of an object or can include a probability of classes that best describe the object in the image.

The first layer of the CNN 400 is the convolutional hidden layer 422a. The convolutional hidden layer 422a analyzes the image data of the input layer 420. Each node of the convolutional hidden layer 422a is connected to a region of nodes (pixels) of the input image called a receptive field. The convolutional hidden layer 422a can be considered as one or more filters (each filter corresponding to a different activation or feature map), with each convolutional iteration of a filter being a node or neuron of the convolutional hidden layer 422a. For example, the region of the input image that a filter covers at each convolutional iteration would be the receptive field for the filter. In some examples, if the input image includes a 28×28 array, and each filter (and corresponding receptive field) is a 5×5 array, then there will be 24×24 nodes in the convolutional hidden layer 422a. Each connection between a node and a receptive field for that node learns a weight and, in some cases, an overall bias such that each node learns to analyze its particular local receptive field in the input image. Each node of the hidden layer 422a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 422a is due to each node of the convolutional layer being applied to its corresponding receptive field. For example, a filter of the convolutional hidden layer 422a can begin in the top-left corner of the input image array and can convolve around the input image. As noted above, each convolutional iteration of the filter can be considered a node or neuron of the convolutional hidden layer 422a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 422a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1422a.

The mapping from the input layer to the convolutional hidden layer 422a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 422a can include several activation maps in order to identify multiple features in an image. The example shown in FIG. 4 includes three activation maps. Using three activation maps, the convolutional hidden layer 422a can detect three different kinds of features, with each feature being detectable across the entire image.

In some examples, a non-linear hidden layer can be applied after the convolutional hidden layer 422a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 400 without affecting the receptive fields of the convolutional hidden layer 422a.

The pooling hidden layer 422b can be applied after the convolutional hidden layer 422a (and after the non-linear hidden layer when used). The pooling hidden layer 422b is used to simplify the information in the output from the convolutional hidden layer 422a. For example, the pooling hidden layer 422b can take each activation map output from the convolutional hidden layer 422a and generates a condensed activation map (or feature map) using a pooling function. Max-pooling is an example of a function performed by a pooling hidden layer. Other forms of pooling functions be used by the pooling hidden layer 422b, such as average pooling, L2-norm pooling, or other suitable pooling functions. A pooling function (e.g., a max-pooling filter, an L2-norm filter, or other suitable pooling filter) is applied to each activation map included in the convolutional hidden layer 422a. In the example shown in FIG. 4, three pooling filters are used for the three activation maps in the convolutional hidden layer 422a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 422a. The output from a max-pooling filter includes the maximum number in every bounding region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 422a having a dimension of 24×24 nodes, the output from the pooling hidden layer 422b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 400.

The final layer of connections in the network is a fully-connected layer that connects every node from the pooling hidden layer 422b to every one of the output nodes in the output layer 424. Using the example above, the input layer includes 28×28 nodes encoding the pixel intensities of the input image, the convolutional hidden layer 422a includes 3×24×24 hidden feature nodes based on application of a 5×5 local receptive field (for the filters) to three activation maps, and the pooling layer 422b includes a layer of 3×12×12 hidden feature nodes based on application of max-pooling filter to 2×2 regions across each of the three feature maps. Extending this example, the output layer 424 can include ten output nodes. In such an example, every node of the 3×12×12 pooling hidden layer 422b is connected to every node of the output layer 424.

The fully connected layer 422c can obtain the output of the previous pooling layer 422b (which should represent the activation maps of high-level features) and determines the features that most correlate to a particular class. For example, the fully connected layer 422c layer can determine the high-level features that most strongly correlate to a particular class, and can include weights (nodes) for the high-level features. A product can be computed between the weights of the fully connected layer 422c and the pooling hidden layer 422b to obtain probabilities for the different classes. For example, if the CNN 400 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 424 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In some examples, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 5:
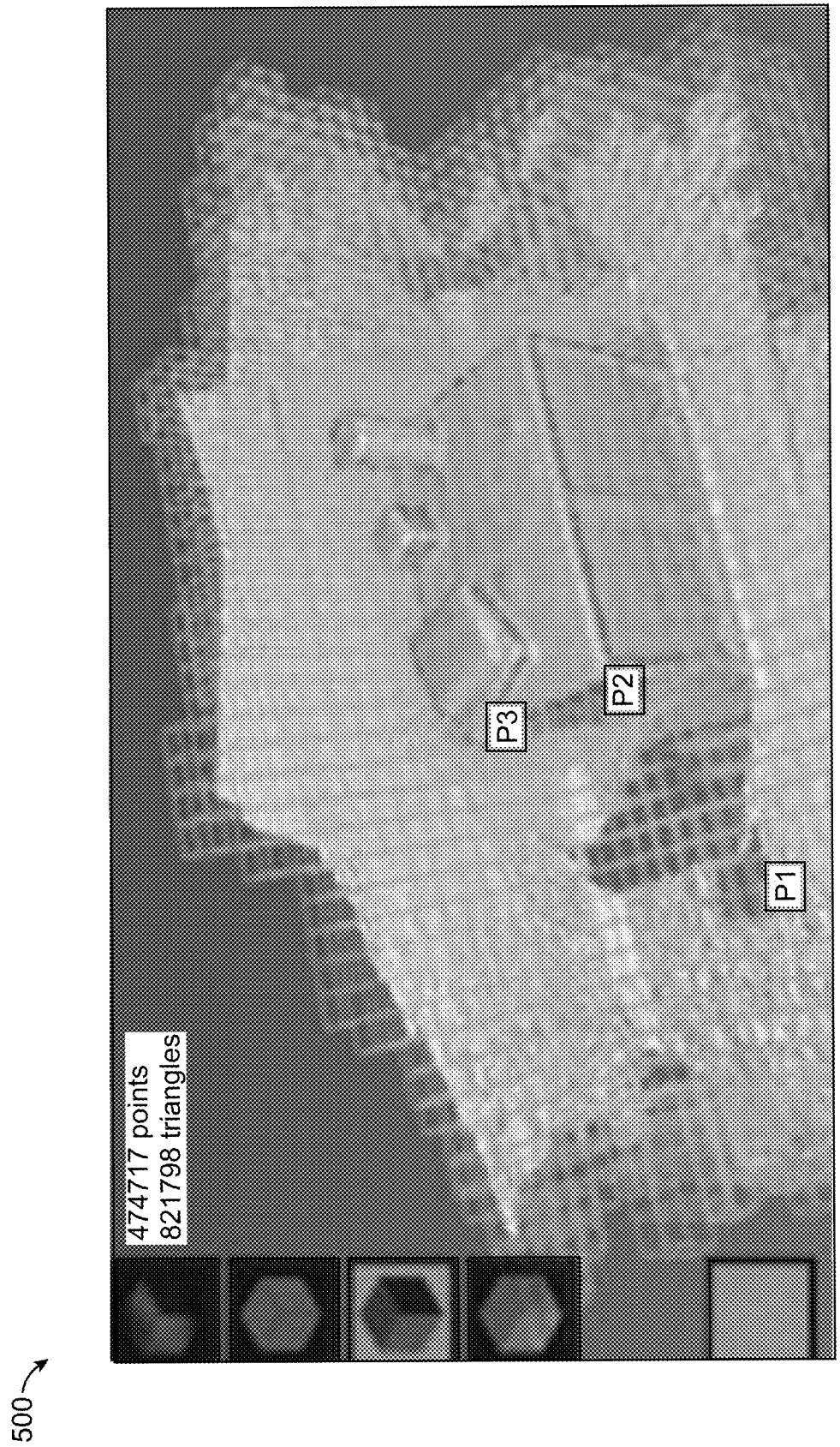
FIG. 5 is a diagram illustrating an example of a 3D surface reconstruction of a scene modeled as a volume grid, in accordance with some examples.

As previously described, three-dimensional reconstruction (3DR) techniques can be used to reconstruct a 3D scene of an environment. FIG. 5 shows an example of a scene that has been modeled as a 3D sparse volumetric representation for 3DR. In particular, FIG. 5 is a diagram illustrating an example of a 3D surface reconstruction 500 of a scene modeled with an overlay of a volume grid containing voxel blocks. For 3DR, a camera (e.g., a stereo camera) may take photos of the scene from various different view points and angles. For example, a camera may take a photo of the scene when the camera is located at position P1. Once multiple photos have been taken of the scene, a 3D representation of the scene can be constructed by modeling the scene as a volume grid with 3D blocks (e.g., composed of sets of voxels).

In one or more examples, an image (e.g., a photo) of a voxel (e.g., within a 3D block, also referred to as a volume block, including a number of voxels, such as 8×8×8 voxels located at point P2 within the scene may be taken by a camera (e.g., a stereo camera) located at point P1 with a certain camera pose (e.g., at a certain angle). The camera can capture both depth and color. From this image, it can be determined that there is an object located at point P2 with a certain depth and, as such, there is a surface. As such, it can be determined that there is an object that maps to this particular voxel. An image of a voxel located at point P3 within the scene may be taken by the same camera located at the point P1 with a different camera pose (e.g., with a different angle). From this image, it can be determined that there is an object located at point P3 with a certain depth and having a surface. As such, it can be determined that there is an object that maps to this particular voxel. An integrate process can occur where all of the blocks within the scene are passed through an integrate function. The integrate function can determine depth information for each of the voxels from the depth frame and can update each block to indicate whether the voxel has a surface or not. The voxels that are determined to have a surface can then be updated with a color.

In one or more examples, the pose of the camera can indicate the location of the camera (e.g., which may be indicated by location coordinates X, Y) and the angle that the camera (e.g., which is the angle that the camera is positioned in for capturing the image). Each block (e.g., the block located at point P2) has a location (e.g., which may be indicated by location coordinates X, Y, Z). The pose of the camera and the location of each block can be used to map each block to world coordinates for the whole scene.

In one or more examples, to achieve fast multiple access to 3D blocks (e.g., voxels), instead of using a large memory lookup table, various different volume block representations may be used to index the blocks in the 3D scene to store data where the measurements are observed. Volume block representations that may be employed can include, but are not limited to, a hash map lookup, an octree, and a large blocks implementation.

Figure 6:
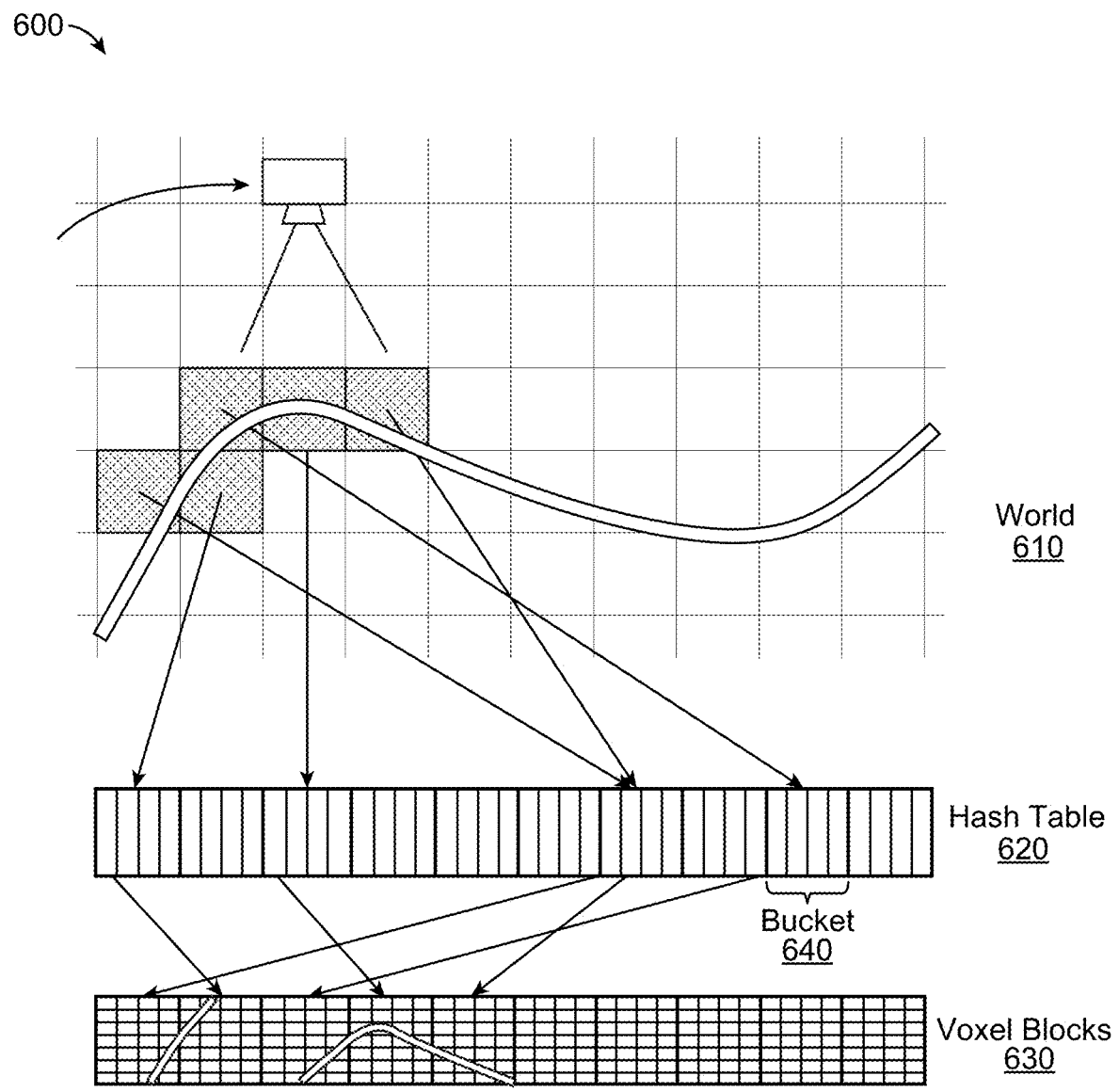
FIG. 6 is a diagram illustrating an example of a hash mapping function for indexing blocks (e.g., voxels) in a volume grid, in accordance with some examples.

FIG. 6 shows an example of a hash map lookup type of volume block representation. In particular, FIG. 6 is a diagram illustrating an example of a hash mapping function 600 for indexing voxel blocks 630 in a volume grid. In FIG. 6, a volume grid is shown with world coordinates 610. Also shown in FIG. 6 are a hash table 620 and voxel blocks 630. In one or more examples, a hash function can be used to map the integer world coordinates 610 into hash buckets 640 within the hash table 620. In one or more examples, the world coordinates 610 can be floating point numbers that are converted (e.g., by dividing an environment into blocks) to integers for lookup within the hash table 620. The hash buckets 640 can each store a small array of points to regular grid voxels blocks 630. Each voxel block 630 contains data that can be used for depth integration.

Figure 7:
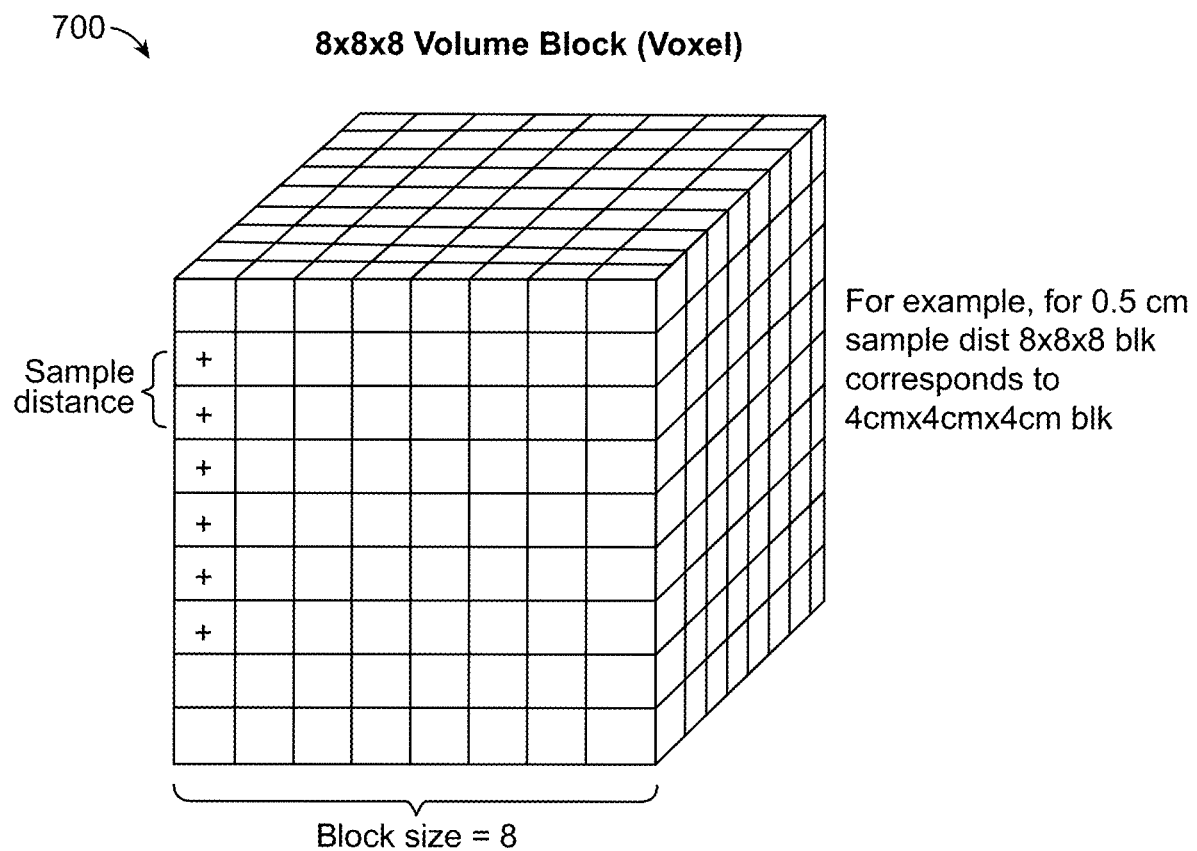
FIG. 7 is a diagram illustrating an example of a block (e.g., a voxel), in accordance with some examples.

FIG. 7 is a diagram illustrating an example of a volume block (e.g., a set of voxels) 700. In FIG. 7, the block 700 is shown to comprise a set of eight by eight by eight (8×8×8) voxels. For instance, the volume block 700 can be composed of 8×8×8 voxels, with each voxel covering a space of 5 cm (e.g., corresponding to a sampling distance), in which case the entire volume block 700 covers the space of 40 cm×40 cm×40 cm.

In one or more examples, each voxel can contain truncated signed distance function (TSDF) samples, a RGB, and a weight. TSDF is a function that measures the distance d of each pixel from the surface of an object to the camera. A voxel with a positive value for d can indicate that the voxel is located in front of a surface, a voxel with a negative value for d can indicate that the voxel is located inside (or behind) the surface, and a voxel with a zero value for d can indicate that the voxel is located on the surface. The distance d is truncated to [−1, 1], such that:

$$tsdf = \begin{cases} -1, & \text{if } d \le -\text{ramp} \\ \frac{d}{\text{ramp}}, & f - \text{ramp} < d < \text{ramp} \\ 1, & \text{if } d \ge \text{ramp} \end{cases}$$

$$\text{sample}.tsdf = \left( \frac{\text{sample.weight} * \text{sample}.tsdf + tsdf}{\text{sample.weight} + 1} \right)$$

A TSDF integration or fusion process can be employed that updates the TSDF values and weights with each new observation from the sensor (e.g., camera).

Figure 8:
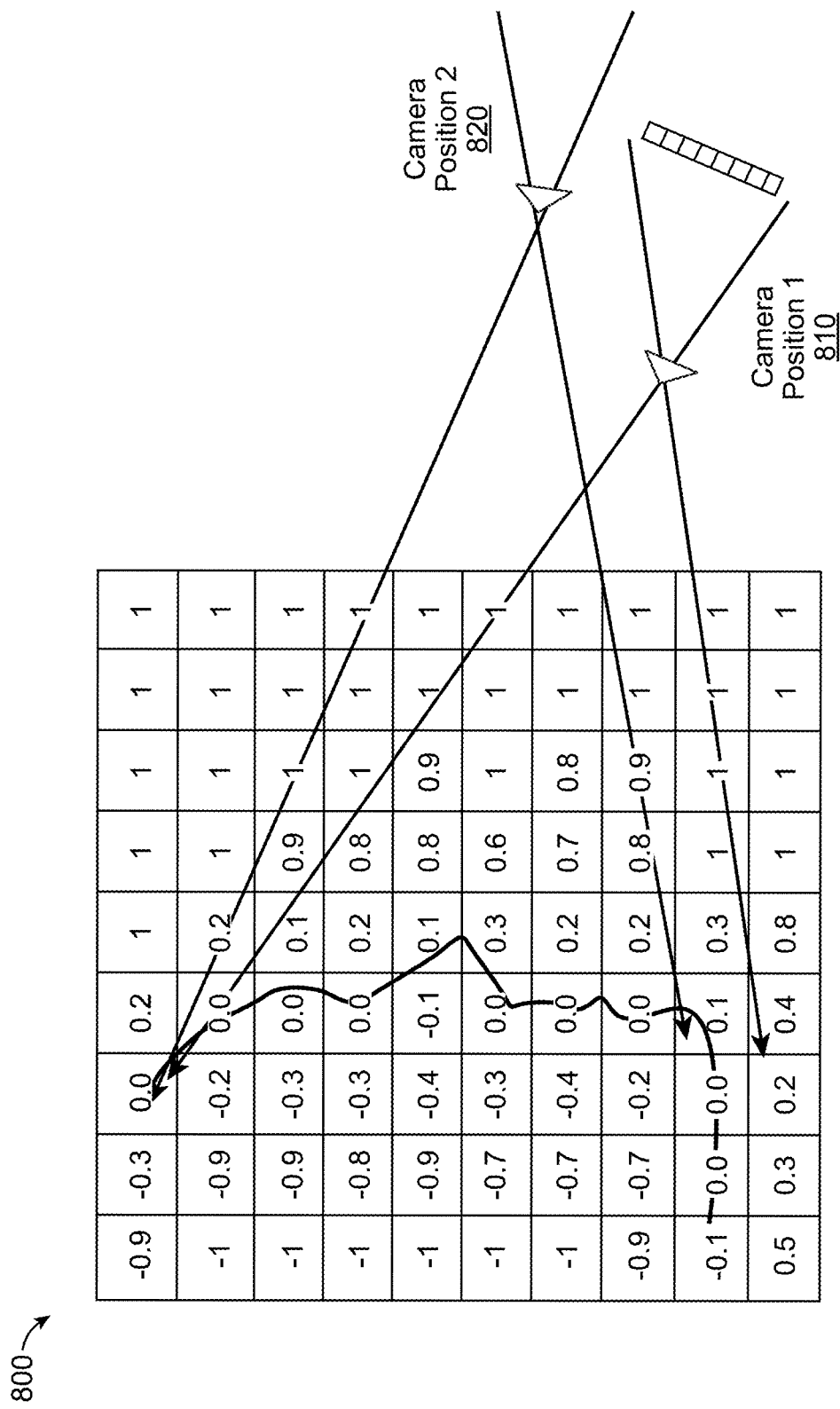
FIG. 8 is a diagram illustrating an example of a truncated signed distance function (TSDF) volume reconstruction, in accordance with some examples.

FIG. 8 is a diagram illustrating an example of a TSDF volume reconstruction 800. In FIG. 8, a voxel grid including a plurality of voxels is shown. A camera is shown to be obtaining images of a scene (e.g., person's face) from two different camera positions (e.g., camera position 1 810 and camera position 2 820). During operation for TSDF, for each new observation (e.g., image) from the camera (e.g., for each image taken by the camera at a different camera position), the distance (d) of a corresponding pixel of each voxel within the voxel grid can be obtained. A truncation distance threshold can be applied on computed signed distance function (SDF) values to be within a range (e.g., −1, 1). The ramp function in the above equation facilitates determinations of a vicinity (e.g., voxels) where SDF updates are applied. The TSDF values (and color values) can be updated in the global memory. In FIG. 8, the voxels with positive values are shown to be located in front of the person's face, the voxels with negative values are shown to be located inside of the person's face, and the voxels with zero values are shown to be located on the surface of the person's face.

In 3DR, a 3D scene can be reconstructed from 2D depth frames and color frames. To accomplish such a reconstruction, the scene may be divided into 3D blocks (e.g., voxels). Each voxel can be projected onto a 2D depth frame and a 2D color frame to determine the voxel's depth and color. Once all of the voxels for the depth frame and color frame are updated accordingly, the process can be repeated for a new depth frame and color frame set.

As noted previously, some computing systems are designed to determine and/or identify regions of a 3D reconstruction with missing geometry information. FIG. 9A through FIG. 9D respectively illustrate various views of an incomplete 3D reconstruction 900a, 900b, 900c, 900d (collectively incomplete 3D reconstruction 900). For example, FIG. 9A and FIG. 9B illustrate example inputs for a computing system to determine regions with missing geometry information in the inputs. For example, FIG. 9A illustrates an incomplete 3D reconstruction 900a based on a captured image (e.g., from a camera, or other sensors 114) or observation (e.g., by sensors 114) of a room from a perspective view. The incomplete 3D reconstruction 900a has missing geometry information. For instance, the incomplete 3D reconstruction 900a has a missing portion 902 of a floor and various missing portions 904, 906, 908, 910 of a ceiling of the room. FIG. 9B illustrates an incomplete 3D reconstruction 900b (e.g., from sensors 114) of the room from an upper perspective view. The incomplete 3D reconstruction 900b further illustrates the missing portion 902 of the floor.

The missing portions 902, 904, 906, 908, 910 may have missing geometry information due to various different factors including, but not limited to, perspective and/or orientation of the sensor, type of surface and/or object being observed, amount of time the sensor is exposed to the surface and/or object, inadequate and/or incomplete depth values, combinations thereof, etc. For example, the sensor may be in a different orientation or have a different perspective compared to a line of sight of a user operating the sensor, resulting in a disparity between what the sensor actually captured and/or observed compared to what the user intended to capture and/or observe. As another example, a user may have simply not directed the sensor at the floor, resulting in a missing portion (e.g., missing portion 902). As another example, the user may be using a time-of-flight (ToF) sensor to capture a reflective surface. In some instances, the ToF sensor may indicate a depth of zero or some other inaccurate value, which would also result in missing geometry information.

A computing system can be configured to determine and/or identify missing portions (e.g., missing portions 902, 904, 906, 908, 910) in the incomplete 3D reconstructions 900a, 900b. For example, the computing system can utilize criteria to determine whether a region is missing portions. The criteria can be configured to determine that a point is a good candidate for completion and/or refinement if the point is (1) unobserved or insufficiently observed, and (2) there exists a dimension where the farthest away geometry is within a threshold (e.g., a farthest surface is not too far away). In some aspects, the region has missing geometry information when the region has a missing value (e.g., a missing TSDF value) or a number of observations of the region is below a threshold number of observations. The criteria is configured to determine whether the point or region is "in between" surfaces within a threshold distance along at least one axis and/or plane. In some aspects, the computing system can determine a location score $I_{i,j,k}$ at the i, j, k location (e.g., a point or region), where i, j, and k are coordinates along three different axes (e.g., X-axis, Y-axis, and Z-axis). For example, the location score can be determined based on Equation 1:

$$I_{i,j,k} = \quad \text{(Equation 1)}$$

-continued $$\min_{axis \in (X,Y,Z)}[\max_{dir \in ((x,y,z),(-x,-y,-z)): x,y,z \in \mathbb{R}} [dist_{i,j,k,axis,dir}]]$$

Equation 1 identifies that the location score $I_{i,j,k}$ at location (i, j, k) is the distance ($dist_{i,j,k,axis,dir}$) from the location to a closest surface on the axis along both positive and negative of direction dir. For example, axial distances from the location to surfaces along an axis in both positive and negative directions are determined. In some aspects, the axial distance can be a minimum of a threshold distance or a distance from the location to the closest surface along the axis for a given direction (e.g., the positive or negative direction). A maximum between the axial distances of each of the positive and negative directions is determined. For example, a determined axial distance is the farther or farthest of the axial distances along the axis. Determined axial distances along other real (R) axes are similarly determined. The location score is then determined based on a minimum of a set of the determined axial distances.

The location score can be used to sort candidate regions in an order (e.g., increasing order). For example, when locations are sorted in an increasing order based on the location score, the first location in a list is a location that is closest to another surface. Additionally, regions having location scores that do not satisfy the criteria (e.g., locations having location scores exceeding a threshold location score) can be removed from consideration.

Based on the order, the computing system can process the sorted regions. For example, the computing system can generate and/or assign a bounding region with a center of mass at the next region of the list. After the bounding region is assigned to a region, the region is removed from subsequent consideration. For example, the region can be removed from the list. The computing system can assign bounding regions in this manner until there are no available regions remaining on the list.

FIG. 9C and FIG. 9D respectively illustrate generated bounding regions that cover and/or are associated with regions determined to have missing geometry information. For example, bounding region 912 is associated with the missing portion 902 of the floor and bounding regions 914, 916, 918, 920 are respectively associated with missing portions 904, 906, 908, 910 of the ceiling (e.g., bounding region 914 corresponds to missing portion 904, bounding region 916 corresponds to missing portion 906, bounding region 918 corresponds to missing portion 908, and bounding region 920 corresponds to missing portion 910). The bounding regions 912, 914, 916, 918, 920 can be generated as a set of 3D tiles that form a shape (e.g., a cube or other shape) around the regions missing geometry information. While illustrated as cubes, the bounding regions 912, 914, 916, 918, 920 can take a variety of different shapes and sizes based on the shape and size of the determined regions. For example, a bounding region can be a sphere around a center of a determined region. In some aspects, the bounding region can include the determined region and a buffer around the determined region. For example, a bounding region can be a same shape as the determined region and simply be larger to provide a buffer around the determined region.

The bounding region can then be provided to a neural network (e.g., neural network 300) for refinement. For example, a neural network can be configured to receive inputs (e.g., one or more determined regions, one or more bounding regions, one or more sets of 3D tiles, etc.) and refine the inputs and/or otherwise generate a refined region of the bounding region and/or the determined region. For example, the neural network can be configured to interpolate the missing geometry information into the determined region to generate the refined region.

As discussed above, according to one illustrative example, the neural network can be a FCN, such as a 3D U-Net, configured for 3D segmentation and label segmentation. The neural network can be trained to, based on received regions having missing geometry information, refine and/or otherwise generate refined regions of the received regions. In some aspects, training the neural network can include obtaining a sequence (e.g., posed depths from a dense prediction transformer (DPT) monocular depth estimation model), performing depth fusion on frames to obtain a determined TSDF value, generating a visibility mask to determine and remove regions having insufficient observations, and subsampling frames to produce partial TSDF values, which can be used for network input. For example, the neural network can be trained on portions or cropped sections of a 3D representation rather than a full volume or complete 3D representation. Accordingly, the neural network forms the basis of learning on handling missing data.

In some aspects, a buffer can be provided in the bounding region around the determined region. The buffer can include data associated with the area around the determined region. The buffer can provide additional context for the neural network to more accurately and/or efficiently refine the determined region and/or the bounding region.

The neural network can output the refined region to a computing system (e.g., computing system 1200) to be combined with the incomplete 3D reconstruction (e.g., incomplete 3D reconstructions 900a, 900b, 900c, 900d) to generate a refined 3D reconstruction. In some aspects, the neural network can be configured to combine the refined region(s) with the incomplete 3D reconstruction to generate the refined 3D reconstruction.

Figure 10:
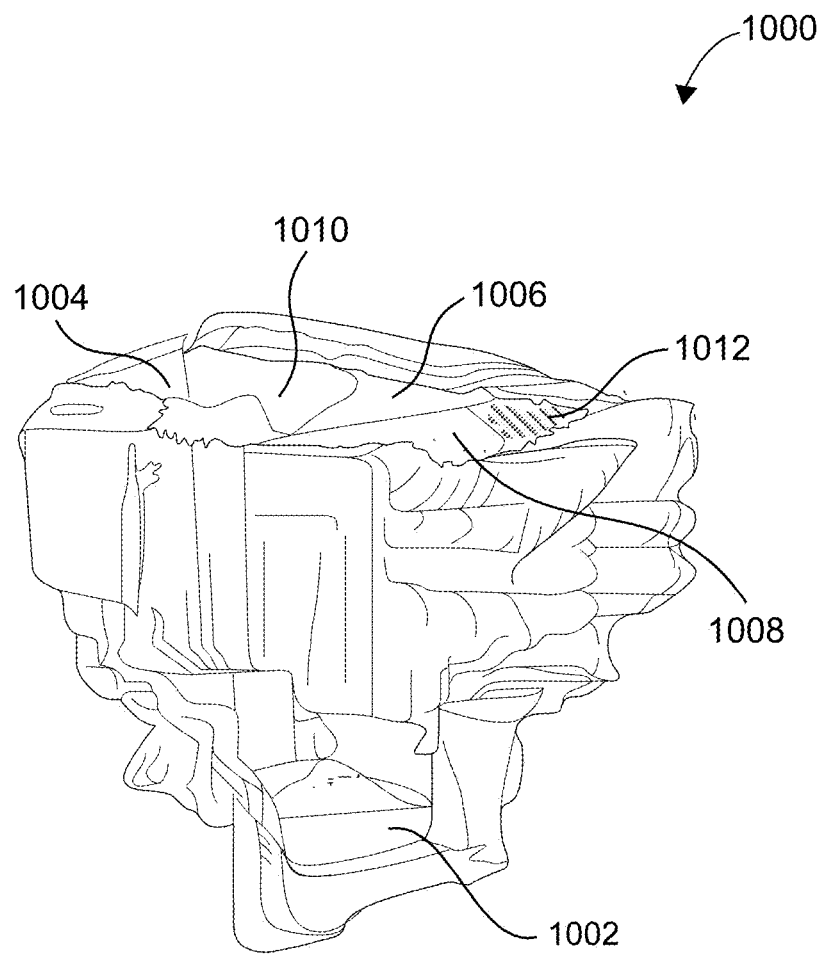
FIG. 10 illustrates a refined 3D reconstruction, in accordance with some examples.

FIG. 10 illustrates a refined 3D reconstruction 1000 based on the incomplete 3D reconstructions 900 and refined regions 1002, 1004, 1006, 1008. For example, the refined 3D reconstruction 1000 combines the refined region 1002, 1004, 1006, 1008 generated by the neural network with the incomplete 3D reconstructions 900. Missing portion 902 of the floor in the incomplete 3D reconstruction 900 is refined into and/or replaced with refined region 1002. Missing portions 904, 906, 908, 910 of the ceiling in the incomplete 3D reconstruction 900 are refined into and/or replaced with refined regions 1004, 1006, 1008, 1010, respectively.

While the neural network can generate the refined regions 1002, 1004, 1006, 1008, the neural network may be unable to fully complete the incomplete 3D reconstruction 900. For example, FIG. 10 demonstrates that the refined 3D reconstruction 1000 can have a missing portion 1012 in the ceiling even after refining other regions.

As discussed above, the location score can be determined for various regions. For example, the location score can continuously be determined for regions with insufficient observations. Furthermore, the location score can change based on additional data. For example, as sensors of the computing system collect more data, additional surfaces are identified, which in turn affects the distance between locations and surfaces. Consequently, a region that previously did not satisfy the criteria may have an updated location score that indicates the region is a good candidate for refinement and now satisfies the criteria.

Figure 11:
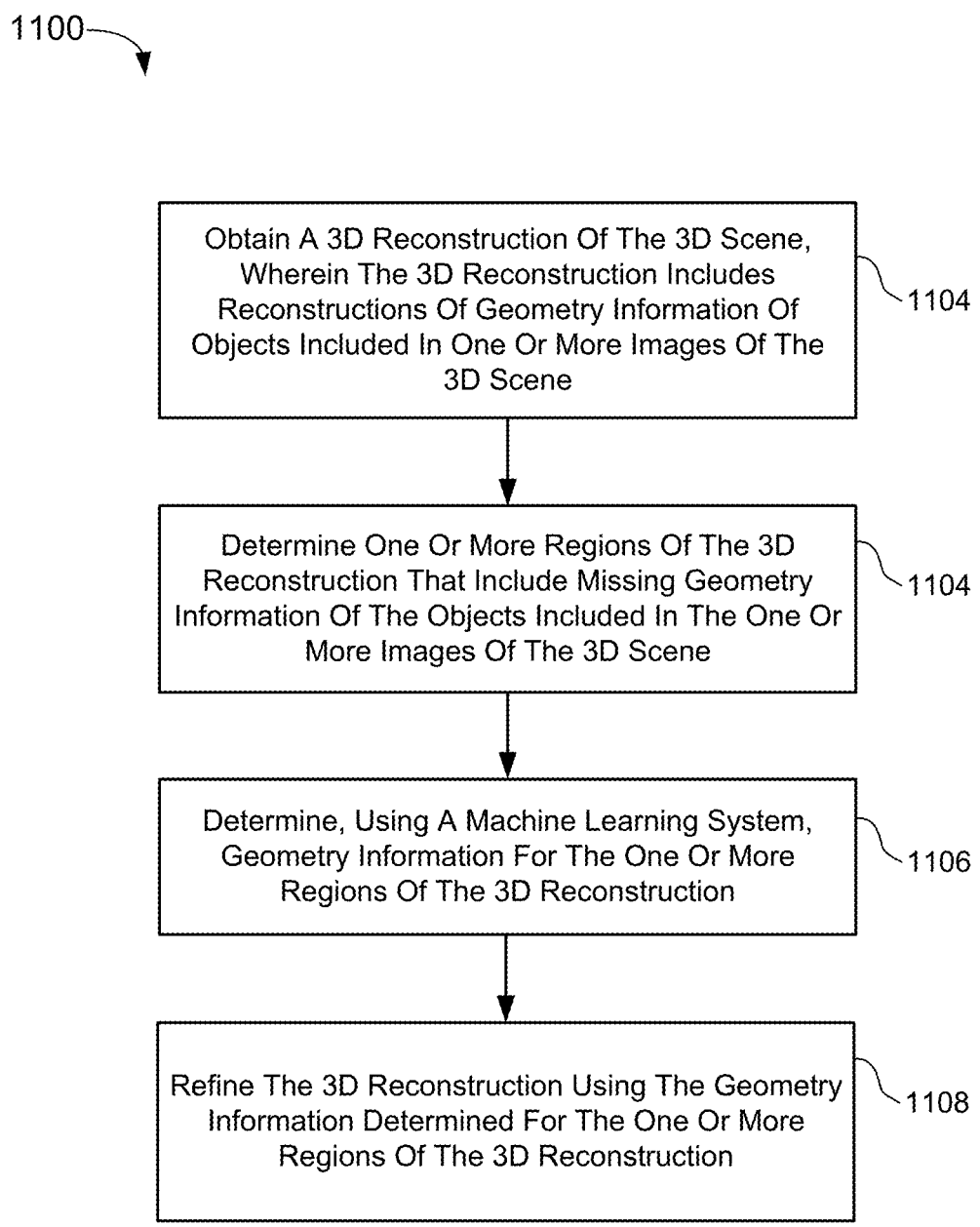
FIG. 11 illustrates an example process for refining an incomplete 3D reconstruction of a 3D scene, in accordance with some examples.

FIG. 11 is a flowchart illustrating an example process 1100 for reconstructing a 3D scene of an environment, using one or more of the techniques described herein. Reconstructing the 3D scene of the environment can include refining an incomplete 3D reconstruction of the 3D scene of the environment. The process 1100 can be performed by a computing device (or apparatus), or a component of a computing device (e.g., a chipset, one or more processors such as CPU(s), GPU(s), NPU(s), NSP(s), DSP(s), etc.), which may utilize or implementing a machine learning model as described above. The computing device or apparatus may be a vehicle or component or system of a vehicle, a mobile device (e.g., a mobile phone), a network-connected wearable such as a watch, an extended reality (XR) device (e.g., a virtual reality (VR) device, augmented reality (AR) device, and/or mixed reality (MR) device), or other type of computing device. In some cases, the computing device or apparatus can be the SOC 100 of FIG. 1, the computing system 1200 of FIG. 12, and/or other computing device or apparatus.

Although the example process 1100 depicts a particular sequence of operations, the sequence may be altered without departing from the scope of the present disclosure. For example, some of the operations depicted may be performed in parallel or in a different sequence that does not materially affect the function of the process 1100. In other examples, different components of an example device or system that implements the process 1100 may perform functions at substantially the same time or in a specific sequence.

At block 1102, the device (or component thereof) can obtain a 3D reconstruction (e.g., the 3D reconstructions 900a, 900b of FIGS. 9A and 9B, respectively) of the 3D scene. The 3D reconstruction of the 3D scene includes reconstructions of geometry information of objects included in one or more images of the 3D scene.

At block 1104, the device (or component thereof) can determine one or more regions (e.g., the missing portions 902, 904, 906, 908, 910 of FIGS. 9A and 9B) of the 3D reconstruction of the 3D scene that include missing geometry information of the objects included in the one or more images of the 3D scene. In some examples, a region has missing geometry information based on the region having a missing value or a number of observations of the region below a threshold number of observations.

In some examples, to determine the one or more regions of the 3D reconstruction of the 3D scene, the device (or component thereof) can determine a first distance in a first direction along a first axis from a first region of the one or more regions of the 3D reconstruction of the 3D scene to a minimum of a first surface or a threshold distance. The device (or component thereof) can further determine a second distance in a second direction along the first axis from the first region to a minimum of a second surface or the threshold distance. In some cases, the device (or component thereof) can determine, based on the first distance and the second distance, whether the first region is between the first surface and the second surface. In some examples, the device (or component thereof) can determine the first region of the one or more regions of the 3D reconstruction of the 3D scene based on a determination that the first region is between the first surface and the second surface.

In some aspects, to determine the one or more regions of the 3D reconstruction of the 3D scene, the device (or component thereof) can determine a third distance in a first direction along a second axis from the first region to a minimum of a third surface or a threshold distance. In some cases, the device (or component thereof) can determine a fourth distance in a second direction along the second axis from the first region to a minimum of a fourth surface or a threshold distance. In some examples, the device (or component thereof) can determine, based on the third distance and the fourth distance, whether the first region is between the third surface and the fourth surface.

In some cases, to determine the one or more regions of the 3D reconstruction of the 3D scene, the device (or component thereof) can determine that a surface is greater than a threshold distance along a first axis from a candidate region. In some aspects, the device (or component thereof) can determine, based on a determination that the surface is not within the threshold distance, that the candidate region does not satisfy a criterion. In some examples, the device (or component thereof) can remove the candidate region from a set of candidate regions. In some cases, the set of candidate regions are regions that have not been observed more than a threshold number of observations.

In some aspects, the device (or component thereof) can determine that a first surface is within a threshold distance along a first axis from a first region of the one or more regions of the 3D reconstruction of the 3D scene. In some cases, the device (or component thereof) can determine that a second surface is within the threshold distance along the first axis from the first region. In some examples, the device (or component thereof) can determine that the first region is between the first surface and the second surface. For instance, the device (or component thereof) can determine the first region of the 3D reconstruction of the 3D scene based on determining that the first region is between the first surface and the second surface.

In some aspects, the device (or component thereof) can generate, based on the determined one or more regions of the 3D reconstruction of the 3D scene, one or more bounding regions for each of the determined one or more regions of the 3D reconstruction of the 3D scene. In some cases, the one or more bounding regions are cropped portions of the 3D reconstruction of the 3D scene that include the determined one or more regions of the 3D reconstruction of the 3D scene.

At block 1106, the device (or component thereof) can determine, using a machine learning system (e.g., the fully connected neural network 202 of FIG. 2A, the locally connected neural network 204 of FIG. 2B, the convolutional neural network 206 of FIG. 2C, the neural network 300 of FIG. 3, CNN 400 of FIG. 4, etc.), geometry information for the one or more regions of the 3D reconstruction of the 3D scene. In some examples, the machine learning system is trained based on cropped subspaces of 3D environments. In some examples, the machine learning system is a neural network.

At block 1108, the device (or component thereof) can refine the 3D reconstruction of the 3D scene using the geometry information determined for the one or more regions of the 3D reconstruction of the 3D scene. In some aspects, to refine the 3D reconstruction of the 3D scene, the device (or component thereof) can refine the one or more bounding regions. In some examples, the one or more bounding regions include the one or more regions of the 3D reconstruction of the 3D scene and a buffer area around the one or more regions.

In some cases, the device (or component thereof) can combine the geometry information determined for the one or more regions of the 3D reconstruction of the 3D scene with the 3D reconstruction of the 3D scene to generate a refined 3D reconstruction of the 3D scene (e.g., the refined 3D reconstruction 1000 of FIG. 10).

In some aspects, the device (or component thereof) can determine one or more regions of the refined 3D reconstruction of the 3D scene that include additional missing geometry information of the objects included in the one or more images of the 3D scene. In some examples, the one or more regions of the refined 3D reconstruction are mutually exclusive from the one or more regions of the 3D reconstruction of the 3D scene.

In some cases, the device (or component thereof) can determine, using the machine learning system, geometry information for the one or more regions of the refined 3D reconstruction. In some examples, the device (or component thereof) can combine the geometry information determined for the one or more regions of the refined 3D reconstruction with the refined 3D reconstruction to generate a second refined 3D reconstruction of the 3D scene.

As noted above, the methods and processes described herein (e.g., process 1100 and/or any other process described herein) may be performed by a computing device or apparatus utilizing or implementing a machine learning model (e.g., the fully connected neural network 202 of FIG. 2A, the locally connected neural network 204 of FIG. 2B, the convolutional neural network 206 of FIG. 2C, the neural network 300 of FIG. 3, CNN 400 of FIG. 4, etc.). In some examples, the process 1100 can be performed by the SOC 100 of FIG. 1. In another example, the process 1100 can be performed by the computing system having the computing device architecture of the computing system 1200 shown in FIG. 12. For instance, a computing device with the computing device architecture of the computing system 1200 shown in FIG. 12 can implement the operations of FIG. 11 and/or the components and/or operations described herein with respect to any of FIG. 5 through FIG. 11.

The computing device can include any suitable device, such as a mobile device (e.g., a mobile phone), a desktop computing device, a tablet computing device, an XR device (e.g., a VR headset, an AR headset, AR glasses, etc.), a wearable device (e.g., a network-connected watch or smartwatch, or other wearable device), a server computer, a vehicle (e.g., an autonomous vehicle) or computing device of the vehicle, a robotic device, a laptop computer, a smart television, a camera, and/or any other computing device with the resource capabilities to perform the processes described herein, including the process 1100 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1100 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
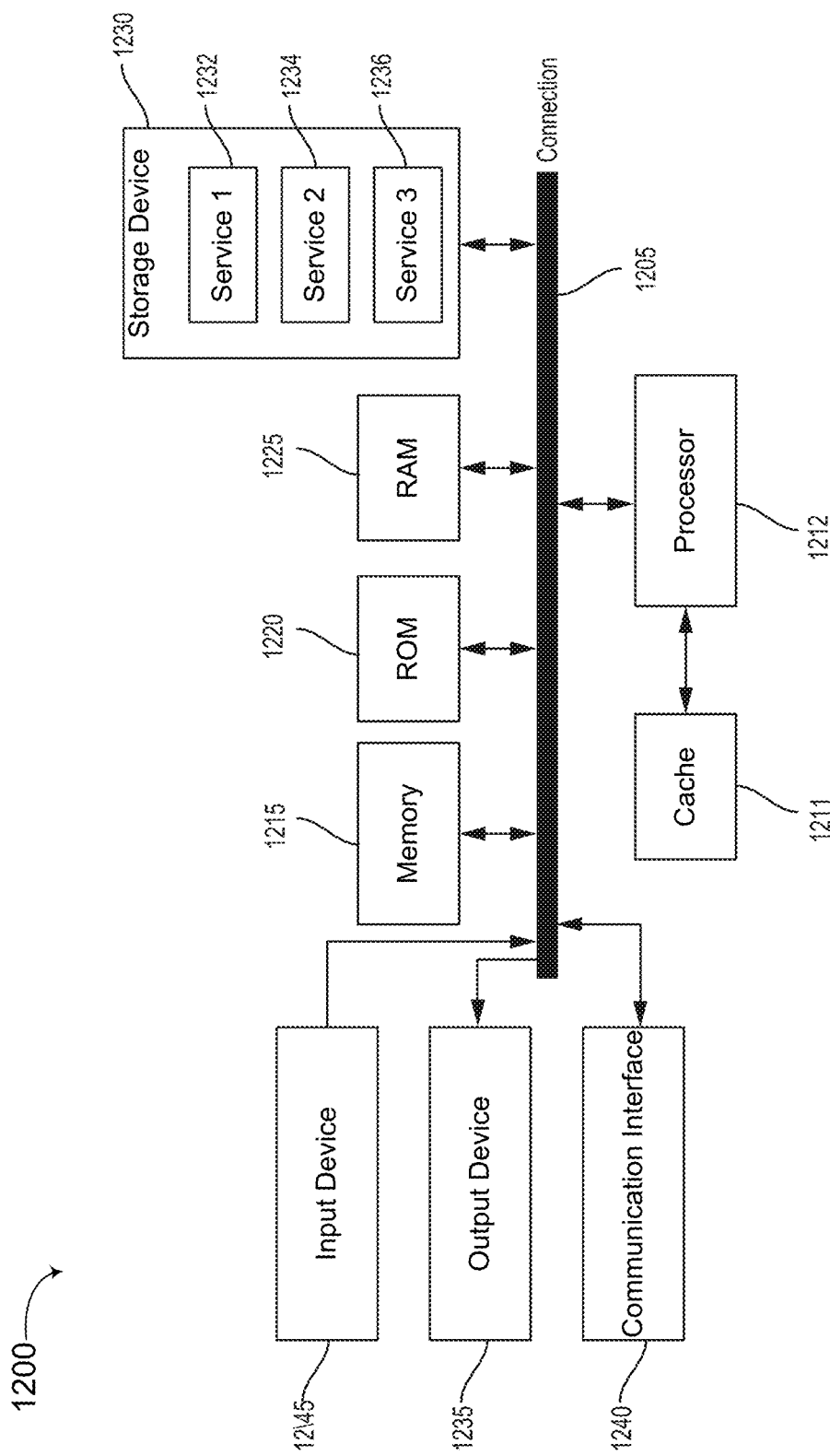
FIG. 12 is a diagram illustrating an example system architecture for implementing certain aspects described herein.

FIG. 12 shows an example of computing system 1200, which can be for example any computing device making up SOC 100, fully connected neural network 202, locally connected neural network 204, convolutional neural network 206, neural network 300, CNN 400, or any component thereof in which the components of the system are in communication with each other using connection 1202. Connection 1202 can be a physical connection via a bus, or a direct connection into processor 1204, such as in a chipset architecture. Connection 1202 can also be a virtual connection, networked connection, or logical connection.

In some aspects, computing system 1200 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1200 includes at least one processing unit (CPU or processor) 1204 and connection 1202 that couples various system components including system memory 1208, such as read-only memory (ROM) 1210 and random access memory (RAM) 1212 to processor 1204. Computing system 1200 can include a cache of high-speed memory 1206 connected directly with, in close proximity to, or integrated as part of processor 1204.

Processor 1204 can include any general purpose processor and a hardware service or software service, such as services 1216, 1218, and 1220 stored in storage device 1214, configured to control processor 1204 as well as a special-purpose processor where software instructions are incorporated into the actual processor design. Processor 1204 may essentially be a completely self-contained computing system, containing multiple cores or processors, a bus, memory controller, cache, etc. A multi-core processor may be symmetric or asymmetric.

To enable user interaction, computing system 1200 includes an input device 1226, which can represent any number of input mechanisms, such as a microphone for speech, a touch-sensitive screen for gesture or graphical input, keyboard, mouse, motion input, speech, etc. Computing system 1200 can also include output device 1222, which can be one or more of a number of output mechanisms known to those of skill in the art. In some instances, multimodal systems can enable a user to provide multiple types of input/output to communicate with computing system 1200. Computing system 1200 can include communication interface 1224, which can generally govern and manage the user input and system output. There is no restriction on operating on any particular hardware arrangement, and therefore the basic features here may easily be substituted for improved hardware or firmware arrangements as they are developed.

Storage device 1214 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1214 can include software services, servers, services, etc., that when the code that defines such software is executed by the processor 1204, it causes the system to perform a function. In some aspects, a hardware service that performs a particular function can include the software component stored in a computer-readable medium in connection with the necessary hardware components, such as processor 1204, connection 1202, output device 1222, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some aspects, a service can be software that resides in memory of a client device and/or one or more servers of a content management system and perform one or more functions when a processor executes the software associated with the service. In some aspects, a service is a program or a collection of programs that carry out a specific function. In some aspects, a service can be considered a server. The memory can be a non-transitory computer-readable medium.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

In the foregoing description, aspects of the application are described with reference to specific examples thereof, but those skilled in the art will recognize that the application is not limited thereto. Thus, while illustrative aspects and examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects and examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects and examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus for reconstructing a three-dimensional (3D) scene of an environment, comprising: at least one memory; and at least one processor coupled to the at least one memory, the at least one processor configured to: obtain a 3D reconstruction of the 3D scene, wherein the 3D reconstruction of the 3D scene includes reconstructions of geometry information of objects included in one or more images of the 3D scene; determine one or more regions of the 3D reconstruction of the 3D scene that include missing geometry information of the objects included in the one or more images of the 3D scene; determine, using a machine learning system, geometry information for the one or more regions of the 3D reconstruction of the 3D scene; and refine the 3D reconstruction of the 3D scene using the geometry information determined for the one or more regions of the 3D reconstruction of the 3D scene.

Aspect 2. The apparatus of Aspect 1, wherein the at least one processor is further configured to: combine the geometry information determined for the one or more regions of the 3D reconstruction of the 3D scene with the 3D reconstruction of the 3D scene to generate a refined 3D reconstruction of the 3D scene.

Aspect 3. The apparatus of Aspect 2, wherein the at least one processor is further configured to: determine one or more regions of the refined 3D reconstruction of the 3D scene that include additional missing geometry information of the objects included in the one or more images of the 3D scene; determine, using the machine learning system, geometry information for the one or more regions of the refined 3D reconstruction; and combine the geometry information determined for the one or more regions of the refined 3D reconstruction with the refined 3D reconstruction to generate a second refined 3D reconstruction of the 3D scene.

Aspect 4. The apparatus of Aspect 3, wherein the one or more regions of the refined 3D reconstruction are mutually exclusive from the one or more regions of the 3D reconstruction of the 3D scene.

Aspect 5. The apparatus of any of Aspects 1 to 4, wherein the at least one processor is further configured to: generate, based on the determined one or more regions of the 3D reconstruction of the 3D scene, one or more bounding regions for each of the determined one or more regions of the 3D reconstruction of the 3D scene, wherein the one or more bounding regions are cropped portions of the 3D reconstruction of the 3D scene that include the determined one or more regions of the 3D reconstruction of the 3D scene, and wherein refining the 3D reconstruction of the 3D scene includes refining the one or more bounding regions.

Aspect 6. The apparatus of Aspect 5, wherein the one or more bounding regions include the one or more regions of the 3D reconstruction of the 3D scene and a buffer area around the one or more regions.

Aspect 7. The apparatus of any of Aspects 1 to 6, wherein a region has missing geometry information based on the region having a missing value or a number of observations of the region below a threshold number of observations.

Aspect 8. The apparatus of any of Aspects 1 to 7, wherein determining the one or more regions of the 3D reconstruction of the 3D scene includes: determining a first distance in a first direction along a first axis from a first region of the one or more regions of the 3D reconstruction of the 3D scene to a minimum of a first surface or a threshold distance; determining a second distance in a second direction along the first axis from the first region to a minimum of a second surface or the threshold distance; and determining, based on the first distance and the second distance, whether the first region is between the first surface and the second surface.

Aspect 9. The apparatus of Aspect 8, wherein determining the first region of the one or more regions of the 3D reconstruction of the 3D scene is based on a determination that the first region is between the first surface and the second surface.

Aspect 10. The apparatus of any of Aspects 8 to 9, wherein determining the one or more regions of the 3D reconstruction of the 3D scene further includes: determining a third distance in a first direction along a second axis from the first region to a minimum of a third surface or a threshold distance; determining a fourth distance in a second direction along the second axis from the first region to a minimum of a fourth surface or a threshold distance; and determining, based on the third distance and the fourth distance, whether the first region is between the third surface and the fourth surface.

Aspect 11. The apparatus of any of Aspects 1 to 10, wherein the at least one processor is further configured to: determine that a first surface is within a threshold distance along a first axis from a first region of the one or more regions of the 3D reconstruction of the 3D scene; determine that a second surface is within the threshold distance along the first axis from the first region; and determine that the first region is between the first surface and the second surface, wherein determining the first region of the 3D reconstruction of the 3D scene is based on determining that the first region is between the first surface and the second surface.

Aspect 12. The apparatus of any of Aspects 1 to 11, wherein determining the one or more regions of the 3D reconstruction of the 3D scene includes: determining that a surface is greater than a threshold distance along a first axis from a candidate region; determining, based on a determination that the surface is not within the threshold distance, that the candidate region does not satisfy a criterion; and removing the candidate region from a set of candidate regions, wherein the set of candidate regions are regions that have not been observed more than a threshold number of observations.

Aspect 13. The apparatus of any of Aspects 1 to 12, wherein the machine learning system is trained based on cropped subspaces of 3D environments.

Aspect 14. The apparatus of any of Aspects 1 to 13, wherein the machine learning system is a neural network.

Aspect 15. A processor-implemented method for reconstructing a three-dimensional (3D) scene of an environment, comprising: obtaining a 3D reconstruction of the 3D scene, wherein the 3D reconstruction of the 3D scene includes reconstructions of geometry information of objects included in one or more images of the 3D scene; determining one or more regions of the 3D reconstruction of the 3D scene that include missing geometry information of the objects included in the one or more images of the 3D scene; determining, using a machine learning system, geometry information for the one or more regions of the 3D reconstruction of the 3D scene; and refining the 3D reconstruction of the 3D scene using the geometry information determined for the one or more regions of the 3D reconstruction of the 3D scene.

Aspect 16. The processor-implemented method of Aspect 15, further comprising: combining the geometry information determined for the one or more regions of the 3D reconstruction of the 3D scene with the 3D reconstruction of the 3D scene to generate a refined 3D reconstruction of the 3D scene.

Aspect 17. The processor-implemented method of Aspect 16, further comprising: determining one or more regions of the refined 3D reconstruction of the 3D scene that include additional missing geometry information of the objects included in the one or more images of the 3D scene; determining, using the machine learning system, geometry information for the one or more regions of the refined 3D reconstruction; and combining the geometry information determined for the one or more regions of the refined 3D reconstruction with the refined 3D reconstruction to generate a second refined 3D reconstruction of the 3D scene.

Aspect 18. The processor-implemented method of Aspect 17, wherein the one or more regions of the refined 3D reconstruction are mutually exclusive from the one or more regions of the 3D reconstruction of the 3D scene.

Aspect 19. The processor-implemented method of any of Aspects 15 to 18, further comprising: generating, based on the determined one or more regions of the 3D reconstruction of the 3D scene, one or more bounding regions for each of the determined one or more regions of the 3D reconstruction of the 3D scene, wherein the one or more bounding regions are cropped portions of the 3D reconstruction of the 3D scene that include the determined one or more regions of the 3D reconstruction of the 3D scene, and wherein refining the 3D reconstruction of the 3D scene includes refining the one or more bounding regions.

Aspect 20. The processor-implemented method of Aspect 19, wherein the one or more bounding regions include the one or more regions of the 3D reconstruction of the 3D scene and a buffer area around the one or more regions.

Aspect 21. The processor-implemented method of any of Aspects 15 to 20, wherein a region has missing geometry information based on the region having a missing value or a number of observations of the region below a threshold number of observations.

Aspect 22. The processor-implemented method of any of Aspects 15 to 21, wherein determining the one or more regions of the 3D reconstruction of the 3D scene includes: determining a first distance in a first direction along a first axis from a first region of the one or more regions of the 3D reconstruction of the 3D scene to a minimum of a first surface or a threshold distance; determining a second distance in a second direction along the first axis from the first region to a minimum of a second surface or the threshold distance; and determining, based on the first distance and the second distance, whether the first region is between the first surface and the second surface.

Aspect 23. The processor-implemented method of Aspect 22, wherein determining the first region of the one or more regions of the 3D reconstruction of the 3D scene is based on a determination that the first region is between the first surface and the second surface.

Aspect 24. The processor-implemented method of any of Aspects 22 or 23, wherein determining the one or more regions of the 3D reconstruction of the 3D scene further includes: determining a third distance in a first direction along a second axis from the first region to a minimum of a third surface or a threshold distance; determining a fourth distance in a second direction along the second axis from the first region to a minimum of a fourth surface or a threshold distance; and determining, based on the third distance and the fourth distance, whether the first region is between the third surface and the fourth surface.

Aspect 25. The processor-implemented method of any of Aspects 15 to 24, further comprising: determining that a first surface is within a threshold distance along a first axis from a first region of the one or more regions of the 3D reconstruction of the 3D scene; determining that a second surface is within the threshold distance along the first axis from the first region; and determining that the first region is between the first surface and the second surface, wherein determining the first region of the 3D reconstruction of the 3D scene is based on determining that the first region is between the first surface and the second surface.

Aspect 26. The processor-implemented method of any of Aspects 15 to 25, wherein determining the one or more regions of the 3D reconstruction of the 3D scene includes: determining that a surface is greater than a threshold distance along a first axis from a candidate region; determining, based on a determination that the surface is not within the threshold distance, that the candidate region does not satisfy a criterion; and removing the candidate region from a set of candidate regions, wherein the set of candidate regions are regions that have not been observed more than a threshold number of observations.

Aspect 27. The processor-implemented method of any of Aspects 15 to 26, wherein the machine learning system is trained based on cropped subspaces of 3D environments.

Aspect 28. The processor-implemented method of any of Aspects 15 to 27, wherein the machine learning system is a neural network.

Aspect 29. A non-transitory computer-readable medium having stored thereon instructions that, when executed by at least one processor, cause the at least one processor to: obtain a 3D reconstruction of the 3D scene, wherein the 3D reconstruction of the 3D scene includes reconstructions of geometry information of objects included in one or more images of the 3D scene; determine one or more regions of the 3D reconstruction of the 3D scene that include missing geometry information of the objects included in the one or more images of the 3D scene; determine, use a machine learning system, geometry information for the one or more regions of the 3D reconstruction of the 3D scene; and refine the 3D reconstruction of the 3D scene using the geometry information determined for the one or more regions of the 3D reconstruction of the 3D scene.

Aspect 30. The computer readable medium of Aspect 29, wherein the processor is configured to execute the computer readable medium and cause the processor to: combine the geometry information determined for the one or more regions of the 3D reconstruction of the 3D scene with the 3D reconstruction of the 3D scene to generate a refined 3D reconstruction of the 3D scene.

Aspect 31. The computer readable medium of Aspect 30, wherein the processor is configured to execute the computer readable medium and cause the processor to: determine one or more regions of the refined 3D reconstruction of the 3D scene that include additional missing geometry information of the objects included in the one or more images of the 3D scene; determining, use the machine learning system, geometry information for the one or more regions of the refined 3D reconstruction; and combine the geometry information determined for the one or more regions of the refined 3D reconstruction with the refined 3D reconstruction to generate a second refined 3D reconstruction of the 3D scene.

Aspect 32. The computer readable medium of Aspect 31, wherein the one or more regions of the refined 3D reconstruction are mutually exclusive from the one or more regions of the 3D reconstruction of the 3D scene.

Aspect 33. The computer readable medium of any of Aspects 29 to 32, wherein generating, based on the determined one or more regions of the 3D reconstruction of the 3D scene, one or more bounding regions for each of the determined one or more regions of the 3D reconstruction of the 3D scene, wherein the one or more bounding regions are cropped portions of the 3D reconstruction of the 3D scene that include the determined one or more regions of the 3D reconstruction of the 3D scene, and wherein refining the 3D reconstruction of the 3D scene includes refining the one or more bounding regions.

Aspect 34. The computer readable medium of Aspect 33, wherein the one or more bounding regions include the one or more regions of the 3D reconstruction of the 3D scene and a buffer area around the one or more regions.

Aspect 35. The computer readable medium of any of Aspects 29 to 34, wherein a region has missing geometry information based on the region having a missing value or a number of observations of the region below a threshold number of observations.

Aspect 36. The computer readable medium of any of Aspects 29 to 35, wherein the processor is configured to execute the computer readable medium and cause the processor to: determine a first distance in a first direction along a first axis from a first region of the one or more regions of the 3D reconstruction of the 3D scene to a minimum of a first surface or a threshold distance; determine a second distance in a second direction along the first axis from the first region to a minimum of a second surface or the threshold distance; and determining, based on the first distance and the second distance, whether the first region is between the first surface and the second surface.

Aspect 37. The computer readable medium of Aspect 36, wherein determining the first region of the one or more regions of the 3D reconstruction of the 3D scene is based on a determination that the first region is between the first surface and the second surface.

Aspect 38. The computer readable medium of any of Aspects 36 or 37, wherein the processor is configured to execute the computer readable medium and cause the processor to: determine a third distance in a first direction along a second axis from the first region to a minimum of a third surface or a threshold distance; determine a fourth distance in a second direction along the second axis from the first region to a minimum of a fourth surface or a threshold distance; and determining, based on the third distance and the fourth distance, whether the first region is between the third surface and the fourth surface.

Aspect 39. The computer readable medium of any of Aspects 29 to 38, wherein determining that a first surface is within a threshold distance along a first axis from a first region of the one or more regions of the 3D reconstruction of the 3D scene; determining that a second surface is within the threshold distance along the first axis from the first region; and determine that the first region is between the first surface and the second surface, wherein determining the first region of the 3D reconstruction of the 3D scene is based on determining that the first region is between the first surface and the second surface.

Aspect 40. The computer readable medium of any of Aspects 29 to 39, wherein determining that a surface is greater than a threshold distance along a first axis from a candidate region; determining, based on a determination that the surface is not within the threshold distance; and remove the candidate region from a set of candidate regions, wherein the set of candidate regions are regions that have not been observed more than a threshold number of observations.

Aspect 41. The computer readable medium of any of Aspects 29 to 40, wherein the machine learning system is trained based on cropped subspaces of 3D environments.

Aspect 42. The computer readable medium of any of Aspects 29 to 41, wherein the machine learning system is a neural network.

Aspect 43. An apparatus comprising: means for obtaining a 3D reconstruction of the 3D scene, wherein the 3D reconstruction of the 3D scene includes reconstructions of geometry information of objects included in one or more images of the 3D scene, means for determining one or more regions of the 3D reconstruction of the 3D scene that include missing geometry information of the objects included in the one or more images of the 3D scene, means for determining, using a machine learning system, geometry information for the one or more regions of the 3D reconstruction of the 3D scene, and means for refining the 3D reconstruction of the 3D scene using the geometry information determined for the one or more regions of the 3D reconstruction of the 3D scene.

Aspect 44. The apparatus of Aspect 43, further comprising: means for combining the geometry information determined for the one or more regions of the 3D reconstruction of the 3D scene with the 3D reconstruction of the 3D scene to generate a refined 3D reconstruction of the 3D scene.

Aspect 45. The apparatus of Aspect 44, further comprising: means for determining one or more regions of the refined 3D reconstruction of the 3D scene that include additional missing geometry information of the objects included in the one or more images of the 3D scene; means for determining, using the machine learning system, geometry information for the one or more regions of the refined 3D reconstruction; and means for combining the geometry information determined for the one or more regions of the refined 3D reconstruction with the refined 3D reconstruction to generate a second refined 3D reconstruction of the 3D scene.

Aspect 46. The apparatus of Aspect 45, wherein the one or more regions of the refined 3D reconstruction are mutually exclusive from the one or more regions of the 3D reconstruction of the 3D scene.

Aspect 47. The apparatus of any of Aspects 43 to 46, further comprising: means for generating, based on the determined one or more regions of the 3D reconstruction of the 3D scene, one or more bounding regions for each of the determined one or more regions of the 3D reconstruction of the 3D scene, wherein the one or more bounding regions are cropped portions of the 3D reconstruction of the 3D scene that include the determined one or more regions of the 3D reconstruction of the 3D scene, and wherein refining the 3D reconstruction of the 3D scene includes refining the one or more bounding regions.

Aspect 48. The apparatus of Aspect 47, wherein the one or more bounding regions include the one or more regions of the 3D reconstruction of the 3D scene and a buffer area around the one or more regions.

Aspect 49. The apparatus of any of Aspects 43 to 48, wherein a region has missing geometry information based on the region having a missing value or a number of observations of the region below a threshold number of observations.

Aspect 50. The apparatus of any of Aspects 43 to 49, wherein determining the one or more regions of the 3D reconstruction of the 3D scene includes: determining a first distance in a first direction along a first axis from a first region of the one or more regions of the 3D reconstruction of the 3D scene to a minimum of a first surface or a threshold distance; determining a second distance in a second direction along the first axis from the first region to a minimum of a second surface or the threshold distance; and determining, based on the first distance and the second distance, whether the first region is between the first surface and the second surface.

Aspect 51. The apparatus of Aspect 50, wherein determining the first region of the one or more regions of the 3D reconstruction of the 3D scene is based on a determination that the first region is between the first surface and the second surface.

Aspect 52. The apparatus of any of Aspects 50 or 51, wherein determining the one or more regions of the 3D reconstruction of the 3D scene further includes: determining a third distance in a first direction along a second axis from the first region to a minimum of a third surface or a threshold distance; determining a fourth distance in a second direction along the second axis from the first region to a minimum of a fourth surface or a threshold distance; and determining, based on the third distance and the fourth distance, whether the first region is between the third surface and the fourth surface.

Aspect 53. The apparatus of any of Aspects 43 to 52, further comprising: means for determining that a first surface is within a threshold distance along a first axis from a first region of the one or more regions of the 3D reconstruction of the 3D scene; means for determining that a second surface is within the threshold distance along the first axis from the first region; and means for determining that the first region is between the first surface and the second surface, wherein determining the first region of the 3D reconstruction of the 3D scene is based on determining that the first region is between the first surface and the second surface.

Aspect 54. The apparatus of any of Aspects 43 to 53, wherein determining the one or more regions of the 3D reconstruction of the 3D scene includes: determining that a surface is greater than a threshold distance along a first axis from a candidate region; determining, based on a determination that the surface is not within the threshold distance, that the candidate region does not satisfy a criterion; and removing the candidate region from a set of candidate regions, wherein the set of candidate regions are regions that have not been observed more than a threshold number of observations.

Aspect 55. The apparatus of any of Aspects 43 to 54, wherein the machine learning system is trained based on cropped subspaces of 3D environments.

Aspect 56. The apparatus of any of Aspects 43 to 55, wherein the machine learning system is a neural network.

What is claimed is:

1. An apparatus for reconstructing a three-dimensional (3D) scene of an environment, comprising:
    at least one memory; and
    at least one processor coupled to the at least one memory, the at least one processor configured to:
        obtain a 3D reconstruction of the 3D scene, wherein the 3D reconstruction of the 3D scene includes reconstructions of geometry information of objects included in one or more images of the 3D scene;
        determine one or more regions of the 3D reconstruction of the 3D scene that include missing geometry information of the objects included in the one or more images of the 3D scene by configuring the at least one processor to:
            determine a first distance in a first direction along a first axis from a first region of the one or more regions of the 3D reconstruction of the 3D scene to a minimum of a first surface or a threshold distance;
            determine a second distance in a second direction along the first axis from the first region to a minimum of a second surface or the threshold distance; and
            determine, based on the first distance and the second distance, whether the first region is between the first surface and the second surface;
        determine, using a machine learning system, geometry information for the one or more regions of the 3D reconstruction of the 3D scene; and
        refine the 3D reconstruction of the 3D scene using the geometry information determined for the one or more regions of the 3D reconstruction of the 3D scene.

2. The apparatus of claim 1, wherein the at least one processor is further configured to:
    combine the geometry information determined for the one or more regions of the 3D reconstruction of the 3D scene with the 3D reconstruction of the 3D scene to generate a refined 3D reconstruction of the 3D scene.

3. The apparatus of claim 2, wherein the at least one processor is further configured to:
    determine one or more regions of the refined 3D reconstruction of the 3D scene that include additional missing geometry information of the objects included in the one or more images of the 3D scene;
    determine, using the machine learning system, geometry information for the one or more regions of the refined 3D reconstruction; and
    combine the geometry information determined for the one or more regions of the refined 3D reconstruction with the refined 3D reconstruction to generate a second refined 3D reconstruction of the 3D scene.

4. The apparatus of claim 3, wherein the one or more regions of the refined 3D reconstruction are mutually exclusive from the one or more regions of the 3D reconstruction of the 3D scene.

5. The apparatus of claim 1, wherein:
    the at least one processor is further configured to generate, based on the determined one or more regions of the 3D reconstruction of the 3D scene, one or more bounding regions for each of the determined one or more regions of the 3D reconstruction of the 3D scene, wherein the one or more bounding regions are cropped portions of the 3D reconstruction of the 3D scene that include the determined one or more regions of the 3D reconstruction of the 3D scene; and
    to refine the 3D reconstruction of the 3D scene, the at least one processor is configured to refine the one or more bounding regions.

6. The apparatus of claim 5, wherein the one or more bounding regions include the one or more regions of the 3D reconstruction of the 3D scene and a buffer area around the one or more regions.

7. The apparatus of claim 1, wherein a region has missing geometry information based on the region having a missing value or a number of observations of the region below a threshold number of observations.

8. The apparatus of claim 1, wherein the at least one processor is configured to determine the first region of the one or more regions of the 3D reconstruction of the 3D scene based on a determination that the first region is between the first surface and the second surface.

9. The apparatus of claim 1, wherein, to determine the one or more regions of the 3D reconstruction of the 3D scene, the at least one processor is configured to:
    determine a third distance in a first direction along a second axis from the first region to a minimum of a third surface or a threshold distance;
    determine a fourth distance in a second direction along the second axis from the first region to a minimum of a fourth surface or a threshold distance; and
    determine, based on the third distance and the fourth distance, whether the first region is between the third surface and the fourth surface.

10. The apparatus of claim 1, wherein the at least one processor is further configured to:

determine that a first surface is within a threshold distance along a first axis from a first region of the one or more regions of the 3D reconstruction of the 3D scene;

determine that a second surface is within the threshold distance along the first axis from the first region;

determine that the first region is between the first surface and the second surface; and determine the first region of the 3D reconstruction of the 3D scene based on determining that the first region is between the first surface and the second surface.

11. The apparatus of claim 1, wherein, to determine the one or more regions of the 3D reconstruction of the 3D scene, the at least one processor is configured to:

determine that a surface is greater than a threshold distance along a first axis from a candidate region;

determine, based on a determination that the surface is not within the threshold distance, that the candidate region does not satisfy a criterion; and remove the candidate region from a set of candidate regions, wherein the set of candidate regions are regions that have not been observed more than a threshold number of observations.

12. The apparatus of claim 1, wherein the machine learning system is trained based on cropped subspaces of 3D environments.

13. The apparatus of claim 1, wherein the machine learning system is a neural network.

14. A method for reconstructing a three-dimensional (3D) scene of an environment, comprising:

obtaining a 3D reconstruction of the 3D scene, wherein the 3D reconstruction of the 3D scene includes reconstructions of geometry information of objects included in one or more images of the 3D scene;

determining one or more regions of the 3D reconstruction of the 3D scene that include missing geometry information of the objects included in the one or more images of the 3D scene, wherein determining the one or more regions of the 3D reconstruction of the 3D scene includes:

determining a first distance in a first direction along a first axis from a first region of the one or more regions of the 3D reconstruction of the 3D scene to a minimum of a first surface or a threshold distance;

determining a second distance in a second direction along the first axis from the first region to a minimum of a second surface or the threshold distance; and determining, based on the first distance and the second distance, whether the first region is between the first surface and the second surface;

determining, using a machine learning system, geometry information for the one or more regions of the 3D reconstruction of the 3D scene; and refining the 3D reconstruction of the 3D scene using the geometry information determined for the one or more regions of the 3D reconstruction of the 3D scene.

15. The method of claim 14, further comprising:

combining the geometry information determined for the one or more regions of the 3D reconstruction of the 3D scene with the 3D reconstruction of the 3D scene to generate a refined 3D reconstruction of the 3D scene.

16. The method of claim 15, further comprising:

determining one or more regions of the refined 3D reconstruction of the 3D scene that include additional missing geometry information of the objects included in the one or more images of the 3D scene;

determining, using the machine learning system, geometry information for the one or more regions of the refined 3D reconstruction; and combining the geometry information determined for the one or more regions of the refined 3D reconstruction with the refined 3D reconstruction to generate a second refined 3D reconstruction of the 3D scene.

17. The method of claim 14, further comprising:

generating, based on the determined one or more regions of the 3D reconstruction of the 3D scene, one or more bounding regions for each of the determined one or more regions of the 3D reconstruction of the 3D scene, wherein the one or more bounding regions are cropped portions of the 3D reconstruction of the 3D scene that include the determined one or more regions of the 3D reconstruction of the 3D scene, and wherein refining the 3D reconstruction of the 3D scene includes refining the one or more bounding regions.

18. The method of claim 14, wherein a region has missing geometry information based on the region having a missing value or a number of observations of the region below a threshold number of observations.

19. An apparatus for reconstructing a three-dimensional (3D) scene of an environment, comprising:

at least one memory; and at least one processor coupled to the at least one memory, the at least one processor configured to:

obtain a 3D reconstruction of the 3D scene, wherein the 3D reconstruction includes reconstructions of geometry information of objects included in one or more images of the 3D scene;

determine one or more regions of the 3D reconstruction of the 3D scene that include missing geometry information of the objects included in the one or more images of the 3D scene;

determine, using a machine learning system, geometry information for the one or more regions of the 3D reconstruction of the 3D scene;

refine the 3D reconstruction using the geometry information determined for the one or more regions of the 3D reconstruction of the 3D scene;

determine that a first surface is within a threshold distance along a first axis from a first region of the one or more regions of the 3D reconstruction of the 3D scene, and a second surface is within the threshold distance along the first axis from the first region;

determine that the first region is between the first surface and the second surface; and determine the first region of the 3D reconstruction based on determining that the first region is between the first surface and the second surface.

* * * * *